US009667864B2

(12) United States Patent
Morimura et al.

(10) Patent No.: US 9,667,864 B2
(45) Date of Patent: May 30, 2017

(54) IMAGE CONVERSION APPARATUS, CAMERA, IMAGE CONVERSION METHOD, AND STORAGE MEDIUM WITH PROGRAM STORED THEREIN

(75) Inventors: Atsushi Morimura, Kanagawa (JP); Qinhe Wang, Fukuoka (JP); Mikio Morioka, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 194 days.

(21) Appl. No.: 14/128,696

(22) PCT Filed: Jun. 22, 2012

(86) PCT No.: PCT/JP2012/004074
§ 371 (c)(1),
(2), (4) Date: Dec. 23, 2013

(87) PCT Pub. No.: WO2013/001773
PCT Pub. Date: Jan. 3, 2013

(65) Prior Publication Data
US 2014/0125761 A1   May 8, 2014

(30) Foreign Application Priority Data
Jun. 29, 2011 (JP) .................... 2011-144116

(51) Int. Cl.
*H04N 7/00* (2011.01)
*H04N 5/232* (2006.01)
(Continued)

(52) U.S. Cl.
CPC ....... *H04N 5/23238* (2013.01); *G06T 3/0062* (2013.01); *G06T 3/40* (2013.01); *H04N 5/2628* (2013.01); *H04N 5/2621* (2013.01)

(58) Field of Classification Search
CPC .................................................. H04N 5/23238
(Continued)

(56) References Cited

U.S. PATENT DOCUMENTS 7,058,237 B2    6/2006  Liu et al.
2002/0181802 A1*  12/2002  Peterson ............... G06T 3/0081
                                                 382/284
(Continued)

FOREIGN PATENT DOCUMENTS

JP    10-105153    4/1998
JP    2003-092750  3/2003
(Continued)

OTHER PUBLICATIONS

International Search Report in PCT/JP2012/004074, mail date is Sep. 4, 2012.

*Primary Examiner* — Gims Philippe
*Assistant Examiner* — Amir Shahnami
(74) *Attorney, Agent, or Firm* — Greenblum & Bernstein, P.L.C.

(57) ABSTRACT

An image converter partially enlarges and reduces a panorama image. The image converter inputs a panorama image, enlarges/reduces the panorama image, such that an enlargement ratio changes continuously in a continuous area of the panorama image. In the image enlargement/reduction, the panorama image is enlarged and reduced such that a width, in the longitudinal direction of the panorama image, of the panorama image after the enlargement/reduction fits into the original panorama image.

14 Claims, 21 Drawing Sheets

(51) Int. Cl.
*H04N 5/262* (2006.01)
*G06T 3/00* (2006.01)
*G06T 3/40* (2006.01)

(58) Field of Classification Search
USPC .......................................................... 348/36
See application file for complete search history.

(56) References Cited

U.S. PATENT DOCUMENTS

| | | | |
|---|---|---|---|
| 2004/0001146 A1 | 1/2004 | Liu et al. | |
| 2004/0042685 A1* | 3/2004 | Zhou | G06K 9/209 382/284 |
| 2006/0238879 A1* | 10/2006 | Togino | G02B 17/0804 359/637 |
| 2007/0189747 A1* | 8/2007 | Ujisato | G03B 37/04 396/72 |
| 2011/0216158 A1* | 9/2011 | Bigioi | G06T 5/006 348/36 |

FOREIGN PATENT DOCUMENTS

| | | |
|---|---|---|
| JP | 2005-148265 | 6/2005 |
| JP | 2007-110675 | 4/2007 |
| JP | 2007-159047 | 6/2007 |
| JP | 4279613 | 6/2009 |

\* cited by examiner

ZOOM OUT (MANY OBJECTS ARE VIEWED)   ZOON IN (LARGE OBJECT IS VIEWED)   ZOOM OUT (MANY OBJECTS ARE VIEWED)

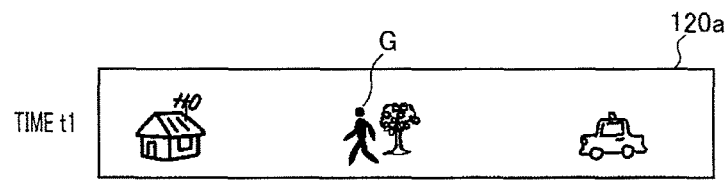
FIG. 29A
FIG. 29B
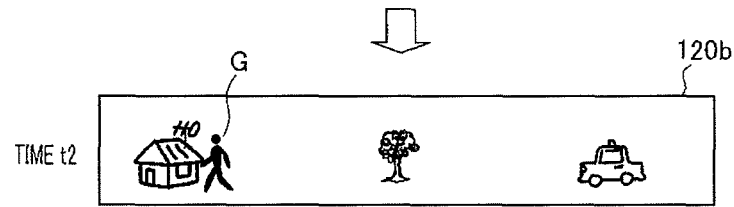
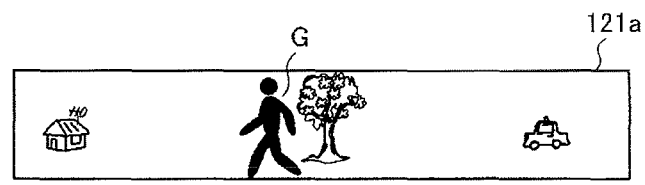
FIG. 30A
FIG. 30B
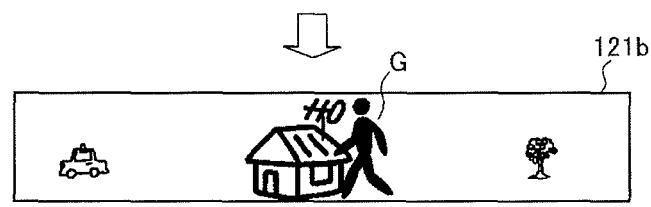
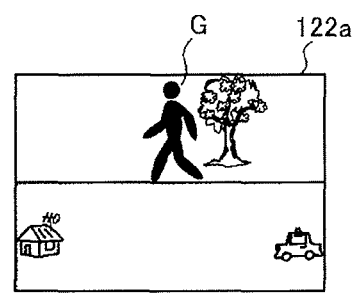
FIG. 31A
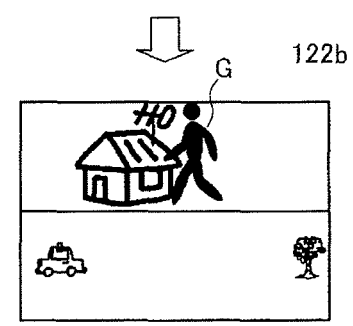
FIG. 31B

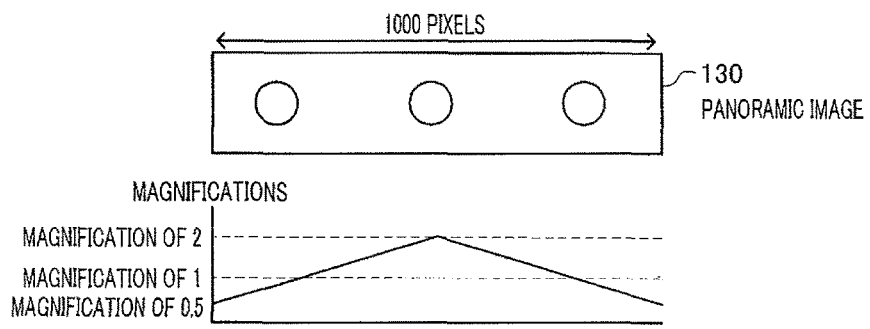
FIG. 32A
FIG. 32B
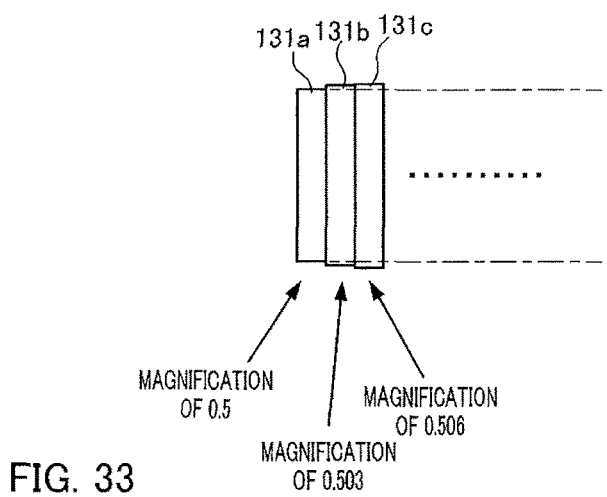
FIG. 33
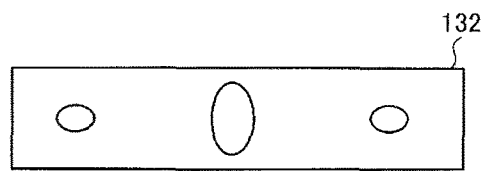
FIG. 34

IMAGE CONVERSION APPARATUS, CAMERA, IMAGE CONVERSION METHOD, AND STORAGE MEDIUM WITH PROGRAM STORED THEREIN

TECHNICAL FIELD

The present invention relates to an image conversion apparatus, a camera, an image conversion method and a recording medium storing a program therein, for converting a panoramic image.

BACKGROUND ART

A digital still camera has been known which continuously captures images while rotating an imaging direction 360 degrees and combines the captured images to generate a panoramic image in which images corresponding to a turn are connected together. In addition, a technique has been known which captures a 360-degree image using a plurality of lenses or captures a 360-degree image from above using a super-wide-angle lens and generates a panoramic image in which images corresponding to a turn are connected together.

As the technique according to the related art related to the invention, Patent Literature (hereinafter, abbreviated as "PTL") 1 and PTL 2 disclose an apparatus which designates any portion of a panoramic image and displays the enlarged image of the designated portion separately from the panoramic image. PTL 3 discloses a technique which captures a plurality of captured images while moving a lens in the horizontal direction and the vertical direction and connecting the captured images in the horizontal direction and the vertical direction to create a panoramic image. PTL 4 discloses an apparatus which displays a panoramic image that is captured at a plurality of imaging points as a balloon in the bird's eye view of the map image and can zoom in and out the bird's eye view. PTL 5 discloses a technique which partially changes the magnification of a horizontally long image that is captured using a wide-angle lens, to enlarge or reduce the image.

CITATION LIST

Patent Literature

PTL 1
Japanese Patent Application Laid-Open No. 2003-092750
PTL 2
Japanese Patent Application Laid-Open No. 2005-148265
PTL 3
Japanese Patent Application Laid-Open No. 2007-159047
PTL 4
Japanese Patent Application Laid-Open No. 2007-110675
PTL 5
Japanese Patent No. 4279613

SUMMARY OF INVENTION

Technical Problem

In the panoramic image including the images corresponding to one turn, in some cases, the photographer or the viewer wants to enlarge a portion of interest and to display the enlarged portion. In addition, 360-degree panoramic images have a characteristic that allows a continuous image to be generated by connecting band-shaped images together in a cylindrical shape. For this reason, the viewer may imagine a panoramic image in a cylindrical shape even from planar panoramic images by connecting the images together in his or her mind Therefore, in general, there arises a demand to maintain the characteristic allowing the images to be connected together in a cylindrical shape, even when the portion of interest is enlarged.

In addition, when a wide range (360°) is monitored, there arises a demand to observe a partially enlarged portion while viewing the whole.

There is no such enlargement feature that satisfies this demand.

An object of the invention is to provide an image conversion apparatus, a camera, an image conversion method, and a recording medium storing a program therein, each makes it possible to partially enlarge or reduce a panoramic image while maintaining the characteristic of panoramic images, which allows panoramic images to be connected together in a cylindrical shape or to be observed in a wide range (up to 360°) at the same time.

Solution to Problem

An image conversion apparatus according to an aspect of the present invention includes: an image receiving section that receives a panoramic image; and an image enlargement/reduction section that enlarges or reduces the panoramic image while varying a magnification of a desired area of the panoramic image such that the magnification continuously varies in a continuous area of the panoramic image, wherein a width of an image which has been enlarged and reduced by the image enlargement/reduction section is fit into the panoramic image in a longitudinal direction.

Advantageous Effects of Invention

According to the invention, the image enlargement/reduction section can partially enlarge or reduce a panoramic image. In addition, the image enlargement/reduction section enlarges or reduces an image such that the magnification is not discontinuous within a range in which the viewing direction of the panoramic image is continuous. Therefore, it is possible to maintain the characteristic of panoramic images, which allows panoramic images to be connected together in a cylindrical shape or to be observed in a wide range (up to 360°) at the same time.

BRIEF DESCRIPTION OF DRAWINGS

FIGS. 29A and 29B are diagrams respectively illustrating a plurality of panoramic images for an object tracking function which are acquired in time series;

FIGS. 30A and 30B are diagrams respectively illustrating a plurality of time-series panoramic images after a zoom projection process which is also used as the object tracking function;

FIGS. 31A and 31B are each a diagram illustrating a display example of a plurality of time-series panoramic images when the object tracking function is used;

FIG. 32A is a diagram illustrating a variation of the panoramic image enlargement/reduction process and illustrating a panoramic image before a panoramic image enlargement/reduction process, and FIG. 32B is a graph illustrating the magnification in each viewing direction;

FIG. 33 is a conceptual diagram illustrating a process of enlarging or reducing a panoramic image in a longitudinal direction;

FIG. 34 is a diagram illustrating a panoramic image after the enlargement/reduction process in the longitudinal direction;

DESCRIPTION OF EMBODIMENTS

Hereinafter, an embodiment of the invention will be described with reference to the drawings.

Figure 1:
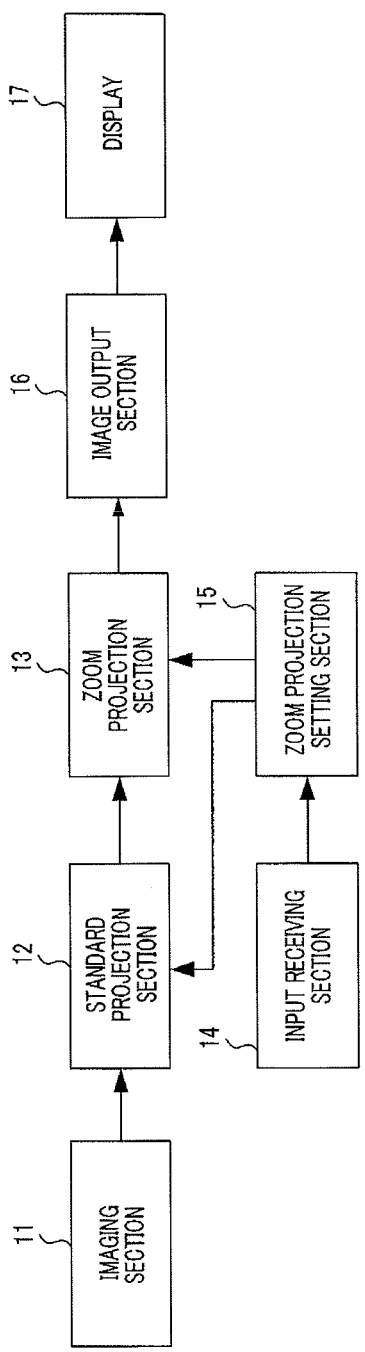
FIG. 1 is a block diagram illustrating the configuration of a camera according to an embodiment of the invention.

FIG. 1 is a block diagram illustrating the configuration of a camera according to the embodiment of the invention.

As illustrated in FIG. 1, the camera according to this embodiment includes, for example, imaging section 11 that captures a panoramic image, standard projection section 12 that performs a standard projection process, which will be described below, for the panoramic image, zoom projection section 13 that serves as an image enlargement/reduction section, input receiving section 14 that receives an operation input from the outside through an operation button, zoom projection setting section 15 that sets various settings of the zoom projection process on the basis of the operation input, image output section 16 that generates display data and outputs image data, and display 17 that receives the display data from the image output section 16 and displays the display data.

Imaging section 11 may have a configuration which performs panorama development for an omni-directional image that is captured by an omni-directional camera using, for example, a fish-eye lens or a mirror, to obtain a panoramic image as the original image. Alternatively, imaging section 11 includes a plurality of lenses which are arranged in a plurality of directions and an imaging element which converts an optical image formed by the plurality of lenses into electric signals, and is thus configured to be capable of capturing a 360-degree image in all directions using the plurality of lenses. In addition, imaging section 11 connects a plurality of image data items captured by the plurality of lenses to generate image data of a panoramic image in which images corresponding to 360° are connected together. Imaging section 11 outputs the image data of the panoramic image to standard projection section 12. Imaging section 11 may have a configuration which includes a direction sensor or a gyro sensor, which allows the user to perform continuous imaging in all directions (360°), and which connects a plurality of image data items obtained by the continuous imaging to obtain the panoramic image. Alternatively, imaging section 11 may have a variety of known configurations capable of obtaining a 360-degree panoramic image.

Zoom projection setting section 15 sets a magnification and an enlargement direction among the viewing directions of the panoramic image on the basis of an operation instruction which is input from the user through input receiving section 14. Then, zoom projection setting section 15 supplies data indicating the enlargement direction and the magnification to zoom projection section 13.

Zoom projection setting section 15 allows the user to input the viewing direction to be enlarged, using, for example, the following process. That is, first, zoom projection setting section 15 displays the panoramic image before zoom projection and a pointer image indicating the enlargement direction on display 17 in an overlapped manner. Then, zoom projection setting section 15 moves the pointer image on the basis of the operation input through input receiving section 14 and determines the viewing direction indicated by the pointer image at the time of the operation input to be the enlargement direction on the basis of an operation for determining the enlargement direction which is input through input receiving section 14. The input of the magnification is determined by allowing the user to select any one of a plurality of magnifications of 1, 2, and 5 through input receiving section 14. Alternatively, the input of the magnification may be determined by allowing the user to select one from the continuous magnification.

Standard projection section 12 receives the image data of the panoramic image from imaging section 11 (image input section) and performs a standard projection process of changing the height of the point of view of the panoramic image or the direction of the field of view, depending on the content of the input data from zoom projection setting section 15. Then, standard projection section 12 outputs the processed image data of the panoramic image to zoom projection section 13. The standard projection process will be described in detail below.

Zoom projection section 13 performs a zoom projection process of enlarging or reducing a portion of the range of the panoramic image, according to the content of the input data from zoom projection setting section 15, while maintaining the characteristic of panoramic images, which allows the images in all directions (hereinafter, referred to as the viewing directions) of the entire circumference of the panoramic image to be continuously connected together. Then, zoom projection section 13 outputs the processed image data of the panoramic image to image output section 16. The projection process will be described in detail below.

Image output section 16 receives the image data of the cylindrical panoramic image from zoom projection section 13 and performs image processing for cutting the panoramic image at any position and placing the panoramic image in a planar shape to generate display data. Then, image output section 16 outputs the display data to display 17 and display 17 displays the display data.

[Standard Projection Process]

Figure 2:
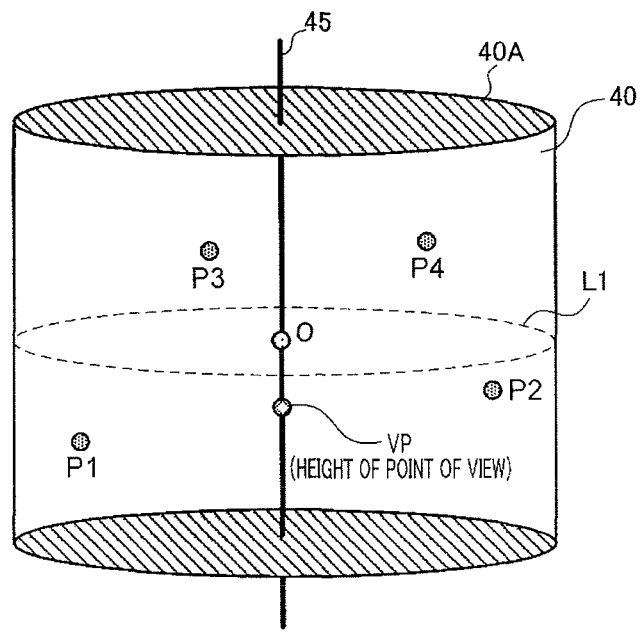
FIG. 2 is a diagram illustrating a three-dimensional mapping space for describing the preparatory stage of a standard projection process.
Figure 3:
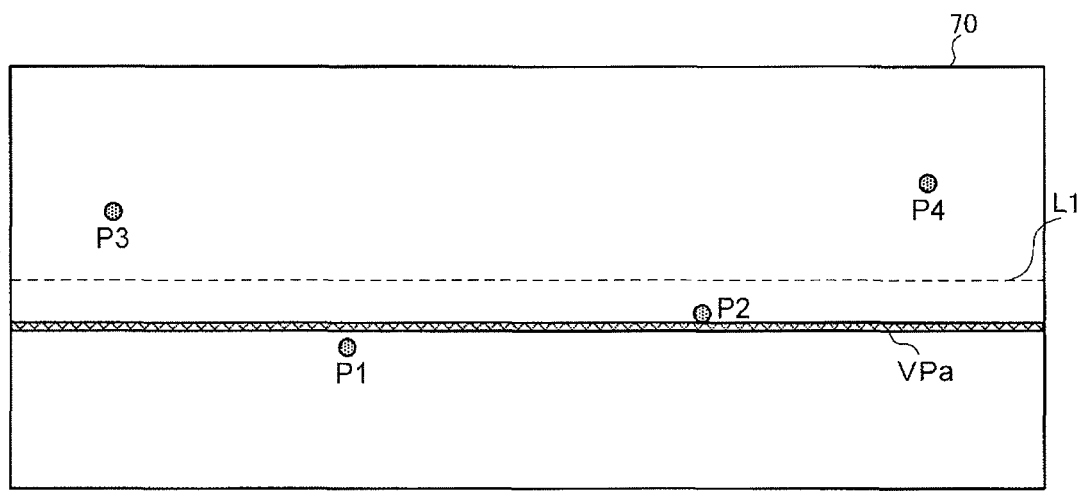
FIG. 3 is a diagram illustrating a panoramic image projected to a cylindrical surface illustrated in FIG. 2.

FIG. 2 is a diagram illustrating a three-dimensional mapping space for describing a preparatory stage of the standard projection process performed by standard projection section 12, and FIG. 3 is a diagram illustrating a panoramic image projected onto a cylindrical surface illustrated in FIG. 2.

The standard projection process changes the height of the point of view or the inclination of the horizontal plane of the panoramic image, with almost no change in the magnification of the panoramic image obtained by imaging section 11. Here, the horizontal plane is not a plane perpendicular to the direction of gravity, but is a plane indicated by the trajectory of a vector when each viewing direction in a turn of the panoramic image is represented by the vector.

When the standard projection process starts, standard projection section 12 constructs cylindrical surface 40 (a side surface of cylinder 40A), which is a projection source, in a virtual three-dimensional mapping space, as illustrated in FIG. 2. Then, standard projection section 12 continuously maps panoramic image 70 supplied from imaging section 11 to cylindrical surface 40. Panoramic image 70 is mapped such that images in all directions forming panoramic image 70 are connected to each other on cylindrical surface 40.

Central horizontal line L1 of panoramic image 70 is mapped to the height of central point O of cylindrical surface 40. In the standard projection process, point of view VP, which is the height of the changed point of view is designated to, for example, an arbitrary height of central axis 45 by the user. Strip-shaped portion VPa of panoramic image 70 is an image portion corresponding to the height of point of view VP. In addition, in the standard projection process, the user designates a point of interest (central point of display), that is, one or a plurality of points P1 to P4 at any positions on panoramic image 70 and the point of interest is converted so as to be the center of image (consequently, the inclination of the horizontal plane is changed).

Figure 4:
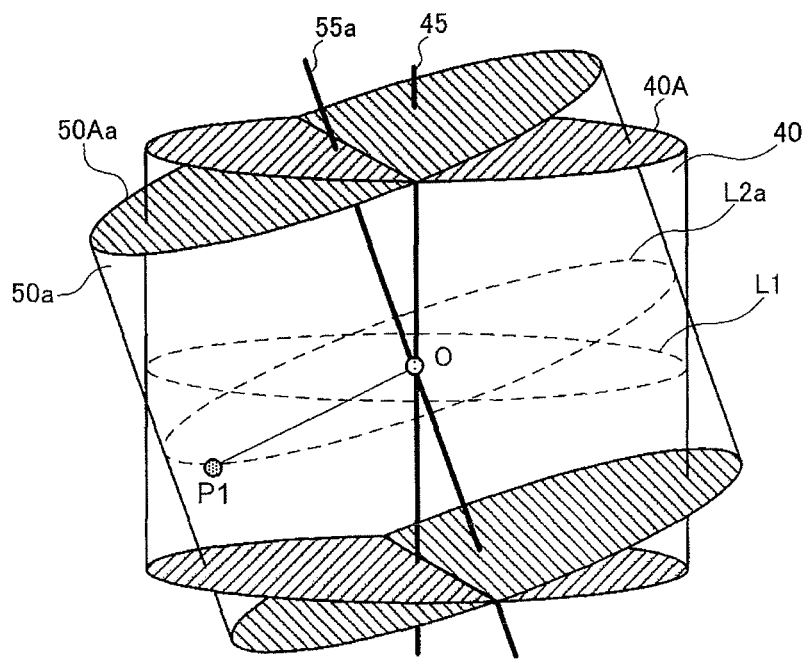
FIG. 4 is a diagram illustrating a three-dimensional mapping space for describing a first example of the standard projection process.
Figure 5:
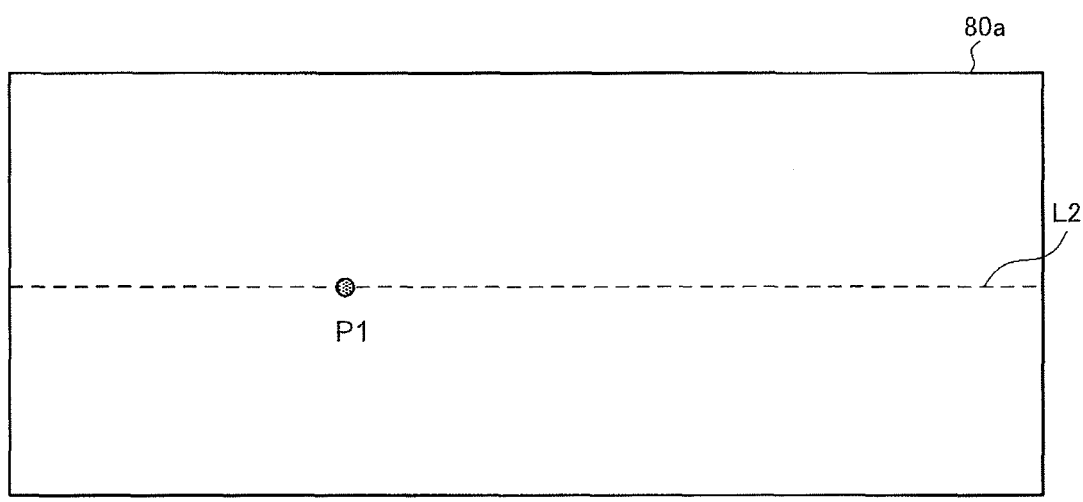
FIG. 5 is a diagram illustrating a panoramic image after the standard projection process illustrated in FIG. 4.

FIG. 4 is a diagram illustrating a three-dimensional mapping space for describing a first example of the standard projection process and FIG. 5 is a diagram illustrating a panoramic image after the standard projection process illustrated in FIG. 4. In the first example of the standard projection process, only one point P1 on panoramic image 70 is designated.

In this case, as illustrated in FIG. 4, standard projection section 12 constructs cylindrical surface 50a (a side surface of cylinder 50Aa), which is a projection destination, in the virtual three-dimensional mapping space such that cylindrical surface 50a has the same diameter (the diameter of cylinder 40A) as cylindrical surface 40, which is a projection source, central point O overlaps that of cylindrical surface 40, and segment O-P1 is perpendicular to central axis 55a. In this case, when the point of view is designated, the position of center O is the position of point of view VP.

After cylindrical surface 50a is constructed, standard projection section 12 performs a process of projecting panoramic image 70 from cylindrical surface 40, which is a projection source, to cylindrical surface 50a, which is a projection destination. In the projection process, central point O is a projection point of view and each pixel of cylindrical surface 40 is projected to cylindrical surface 50a. Alternatively, projection may be performed using central axis 55a as a projection center such that the pixels are not spread in the longitudinal direction.

As illustrated in FIG. 5, panoramic image 80a in which point P1 designated on original panoramic image 70 overlaps central horizontal line L2 is generated by the standard projection process. In addition, panoramic image 80a is generated in which the horizontal plane is inclined such that a line of sight differently rises and falls in the direction of point P1 and a direction opposite to the direction.

In projected panoramic image 80a, an image at the upper end or the lower end of any one of all viewing directions is absent. However, the upper and lower end portions of the images in all viewing directions are trimmed to generate strip-shaped panoramic image 80a and panoramic image 80a can be transmitted to zoom projection section 13.

Figure 6:
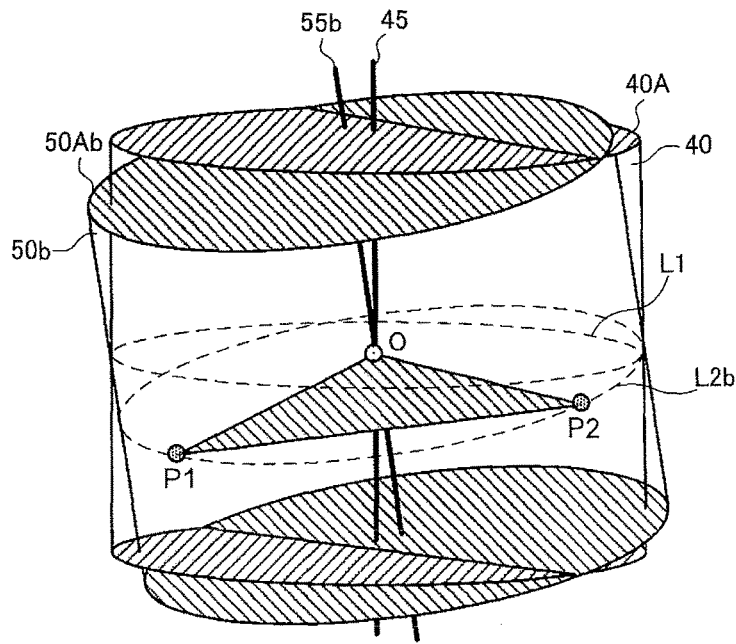
FIG. 6 is a diagram illustrating a three-dimensional mapping space for describing a second example of the standard projection process.
Figure 7:
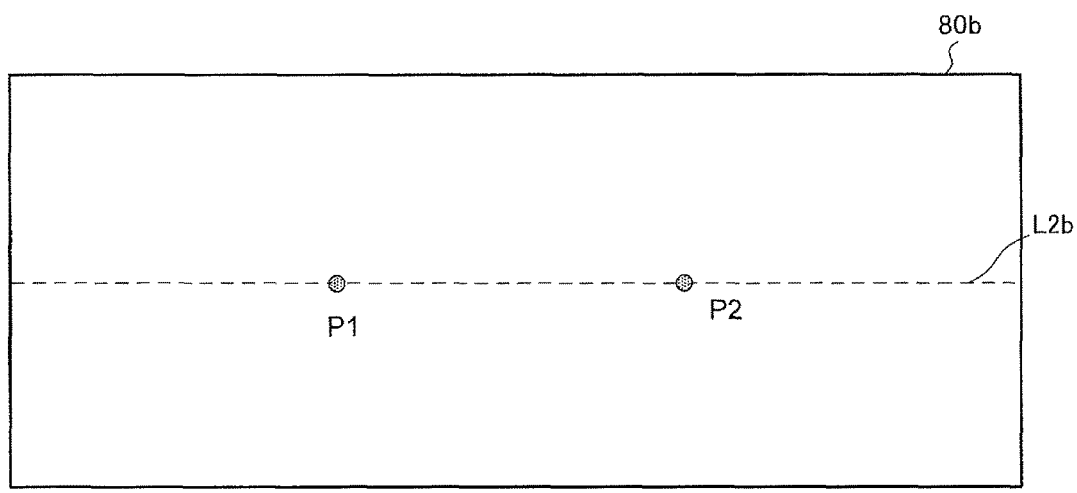
FIG. 7 is a diagram illustrating a panoramic image after the standard projection process illustrated in FIG. 6.

FIG. 6 is a diagram illustrating a three-dimensional mapping space for describing a second example of the standard projection process and FIG. 7 is a diagram illustrating a panoramic image after the standard projection process illustrated in FIG. 6. In the second example of the standard projection process, two points P1 and P2 on panoramic image 70 are designated.

In this case, standard projection section 12 constructs cylindrical surface 50b (a side surface of cylinder 50Ab), which is a projection destination, in the virtual three-dimensional mapping space such that cylindrical surface 50b has the same diameter as cylindrical surface 40, which is a projection source, central point O overlaps that of cylindrical surface 40, and triangle O-P1-P2 is parallel to the bottom of cylinder 50Ab. Then, standard projection section 12 projects panoramic image 70 from cylindrical surface 40 to cylindrical surface 50b, as described above. Standard projection section 12 sets central point O as the position of point of view VP when point of view VP is not designated.

According to the standard projection process, as illustrated in FIG. 7, panoramic image 80b is generated in which points P1 and P2 designated on original panoramic image 70 overlap central horizontal line L2b. Since the direction of points P1 and P2 is at the center of image 80b, panoramic image 80b is generated in which the line of sight differently rises and falls in the opposite direction of the points and the horizontal plane is inclined.

Figure 8:
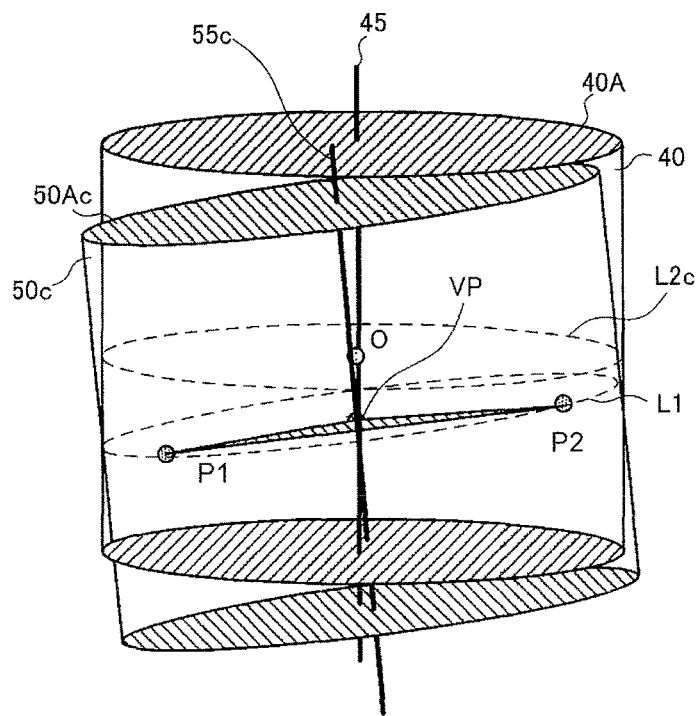
FIG. 8 is a diagram illustrating a three-dimensional mapping space for describing a third example of the standard projection process.
Figure 9:
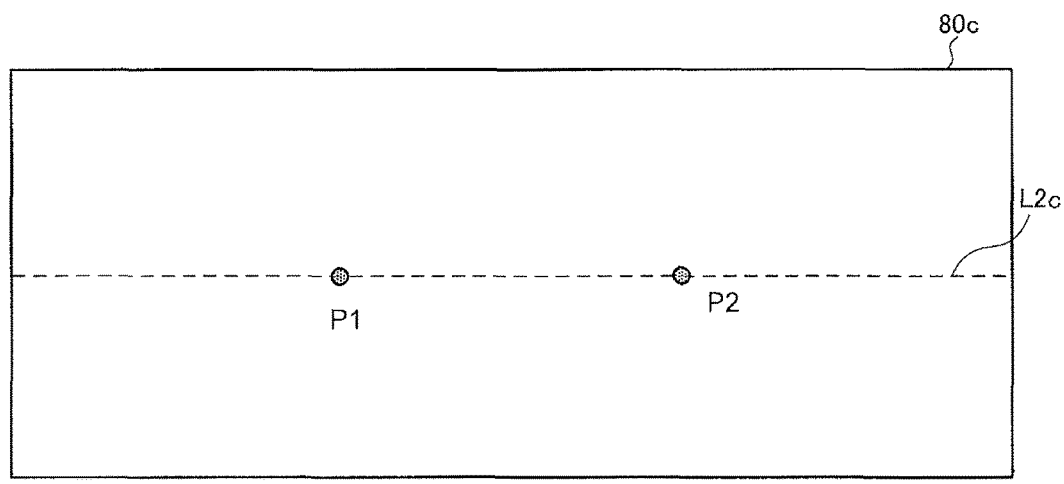
FIG. 9 is a diagram illustrating a panoramic image after the standard projection process illustrated in FIG. 8.

FIG. 8 is a diagram illustrating a three-dimensional mapping space for describing a third example of the standard projection process and FIG. 9 is a diagram illustrating a panoramic image after the standard projection process illustrated in FIG. 8. In the third example of the standard projection process, two points P1 and P2 on panoramic image 70 and point of view VP are designated.

In this case, standard projection section 12 constructs cylindrical surface 50c (a side surface of cylinder 50Ac), which is a projection destination, in the virtual three-dimensional mapping space such that cylindrical surface 50c has the same diameter as cylindrical surface 40, which is a projection source, triangle P1-P2-VP is parallel to the bottom of cylinder 50Ac, and point of view VP is a new central point. Then, standard projection section 12 projects panoramic image 70 from cylindrical surface 40 to cylindrical surface 50c, as described above.

According to the standard projection process, as illustrated in FIG. 9, panoramic image 80c is generated in which points P1 and P2 designated on original panoramic image 70 overlap central horizontal line L2c and the image of center horizontal line L2c is an image viewed from point of view VP.

Figure 10:
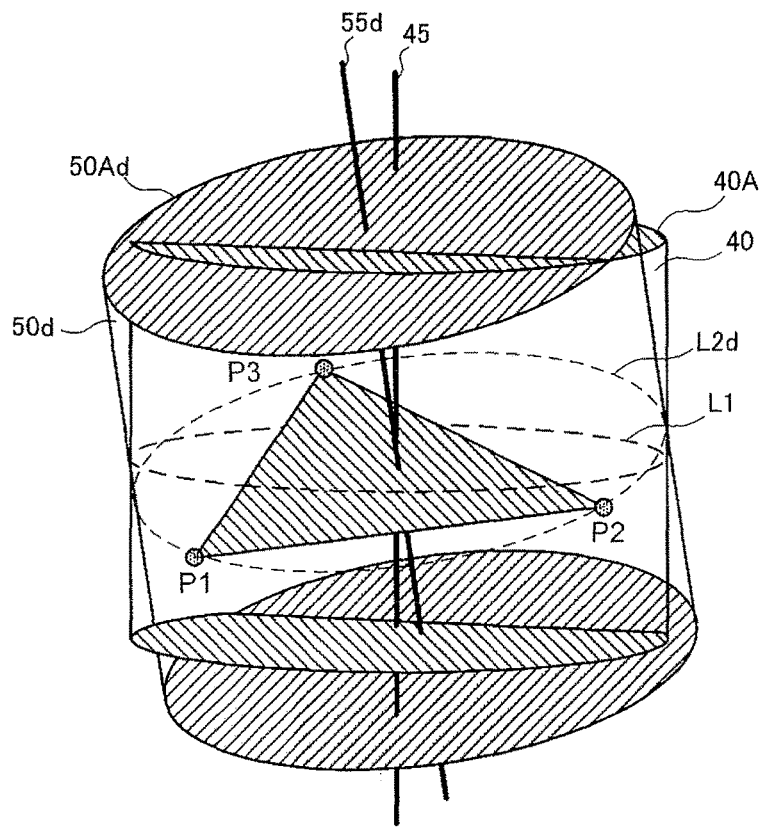
FIG. 10 is a diagram illustrating a three-dimensional mapping space for describing a fourth example of the standard projection process.
Figure 11:
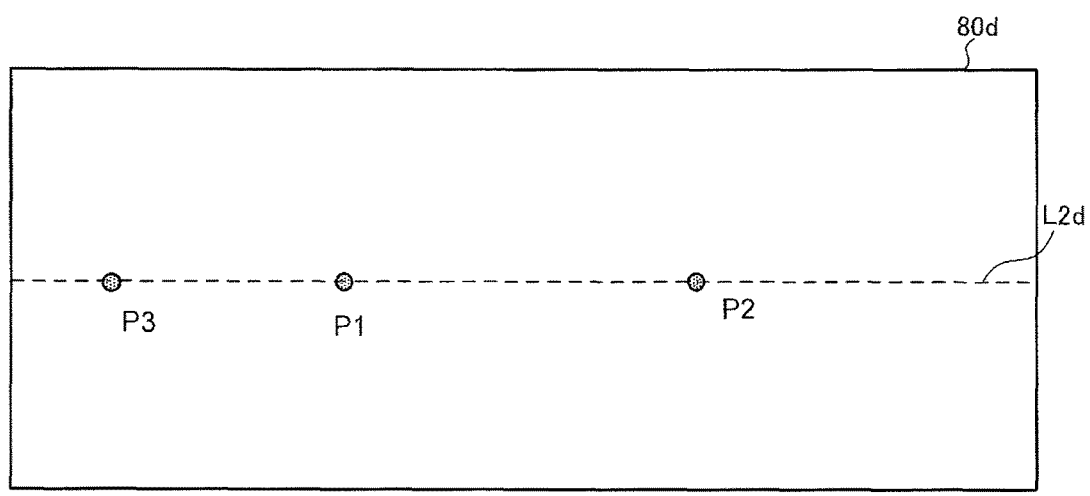
FIG. 11 is a diagram illustrating a panoramic image after the standard projection process illustrated in FIG. 10.

FIG. 10 is a diagram illustrating a three-dimensional mapping space for describing a fourth example of the standard projection process and FIG. 11 is a diagram illustrating a panoramic image after the standard projection process illustrated in FIG. 10. In the fourth example of the standard projection process, three points P1, P2, and P3 on panoramic image 70 are designated.

In this case, standard projection section 12 constructs cylindrical surface 50d (a side surface of cylinder 50Ad), which is a projection destination, in the virtual three-dimensional mapping space such that cylindrical surface 50d has the same diameter as cylindrical surface 40, which is a projection source, triangle P1-P2-P3 is parallel to the bottom of cylinder 50Ad, and a new central point overlaps triangle P1-P2-P3. Then, standard projection section 12 projects panoramic image 70 from cylindrical surface 40 to cylindrical surface 50d, as described above.

According to the standard projection process, as illustrated in FIG. 11, panoramic image 80d is generated in which points P1, P2, and P3 designated on original panoramic image 70 overlap central horizontal line L2d.

Figure 12:
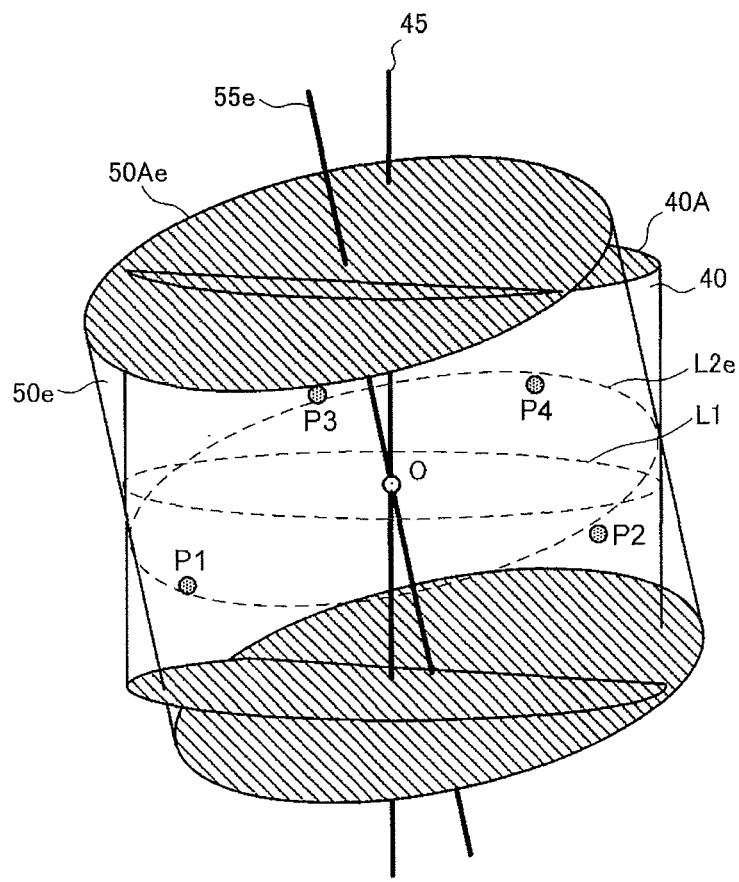
FIG. 12 is a diagram illustrating a three-dimensional mapping space for describing a fifth example of the standard projection process.
Figure 13:
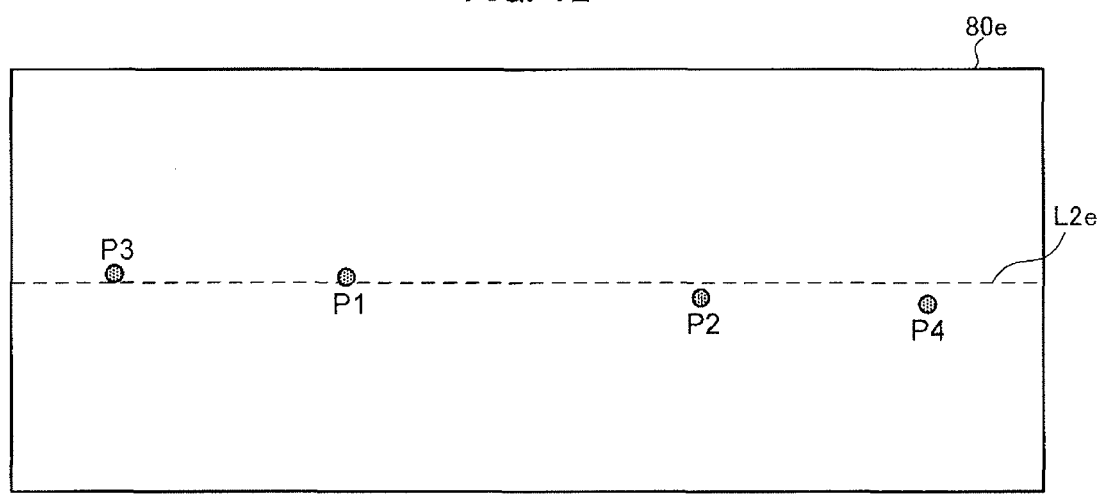
FIG. 13 is a diagram illustrating a panoramic image after the standard projection process illustrated in FIG. 11.

FIG. 12 is a diagram illustrating a three-dimensional mapping space for describing a fifth example of the standard projection process and FIG. 13 is a diagram illustrating a panoramic image after the standard projection process illustrated in FIG. 12. In the fifth example of the standard projection process, points P1 to P4 more than three points on panoramic image 70 are designated.

In this case, standard projection section 12 constructs cylindrical surface 50e (a side surface of cylinder 50Ae), which is a projection destination, in the virtual three-dimensional mapping space such that cylindrical surface 50e has the same diameter as cylindrical surface 40, which is a projection source, a specific plane (a plane including horizontal line L2e) which has an overall short distance to each of designated points P1 to P4 is parallel to the bottom of cylinder 50Ae, and a new central point overlaps the specific plane. The specific plane can be calculated by, for example, a least-square method such that the sum of squares of the distances between the specific plane and designated points P1 to P4 is the minimum. Then, standard projection section 12 projects panoramic image 70 from cylindrical surface 40 to cylindrical surface 50e, as described above.

According to the standard projection process, as illustrated in FIG. 13, panoramic image 80e is generated in which points P1 to P4 designated on original panoramic image 70 are overall close to central horizontal line L2e.

Then, panoramic images 80a to 80e which are generated by the standard projection process as described above, are transmitted to zoom projection section 13 and the following zoom projection process is performed.

[Zoom Projection Process]

Figure 14:
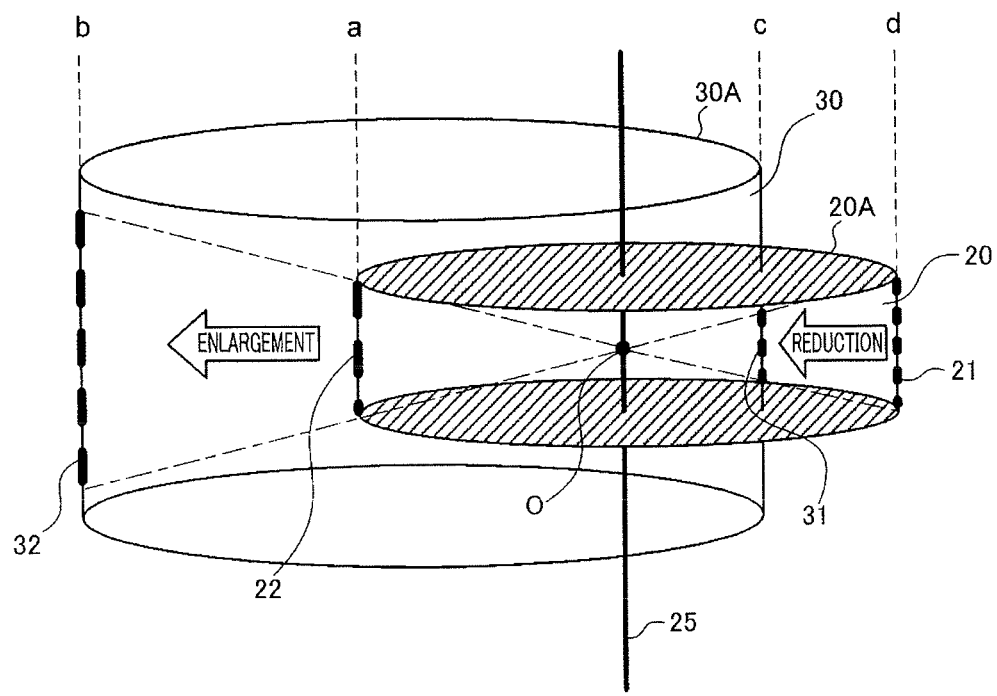
FIG. 14 is a diagram illustrating a three-dimensional mapping space for describing a zoom projection process for a panoramic image.
Figure 15:
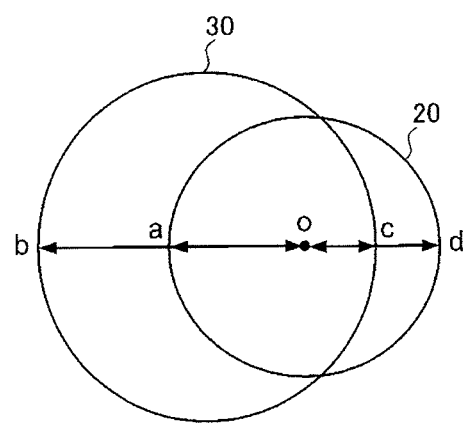
FIG. 15 is a diagram illustrating a relative distance between a first cylindrical surface (original image surface) and a second cylindrical surface (projection surface) used for the zoom projection process.
Figures 16A, 16B:
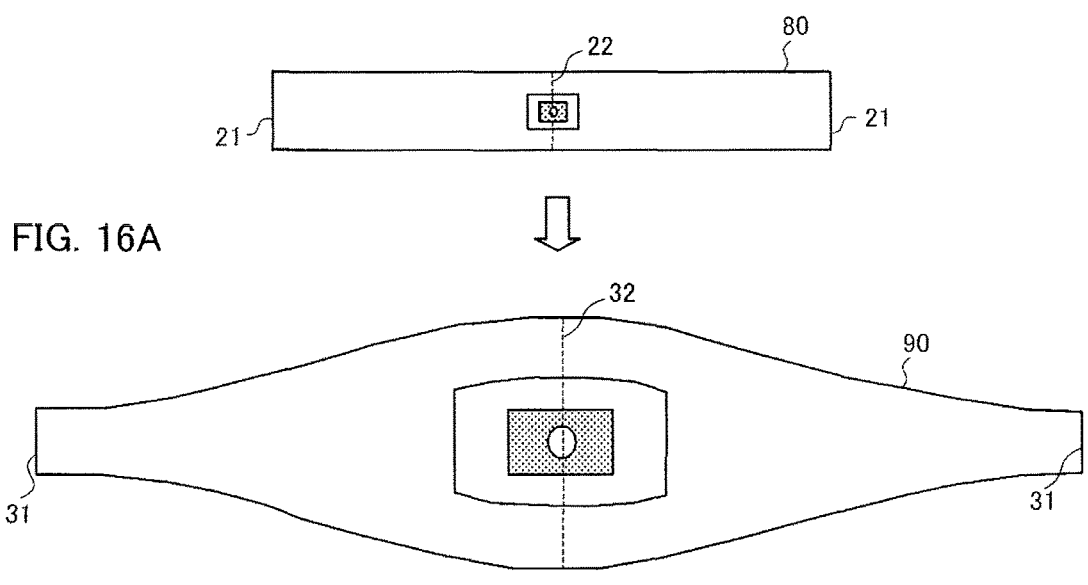
FIG. 16A is a diagram illustrating a panoramic image before the zoom projection process.
FIG. 16B is a diagram illustrating a panoramic image after the zoom projection process.

FIG. 14 is a diagram illustrating a three-dimensional mapping space for describing a panoramic image zoom projection process. FIG. 15 is a diagram illustrating the relative distance between a first cylindrical surface and a second cylindrical surface used in the zoom projection process. An image subjected to an alignment process, such as a process of changing the height of the point of view or the inclination of the horizontal plane output from the standard projection section, is mapped to the first cylindrical surface and the second cylindrical surface is a projection surface. FIG. 16A is a diagram illustrating a panoramic image before the zoom projection process which is obtained from the standard projection section and FIG. 16B is a diagram illustrating a panoramic image after the zoom projection process.

The zoom projection process is performed by zoom projection section 13 as follows. That is, first, as illustrated in FIG. 14, zoom projection section 13 constructs first cylindrical surface 20 (a side surface of cylinder 20A) and second cylindrical surface 30 (a side surface of cylinder 30A) in the three-dimensional mapping space. First cylindrical surface 20 and second cylindrical surface 30 are constructed such that the central axes (the central axes of cylinders 20A and 30A) thereof are parallel to each other and the length of second cylindrical surface 30 in the longitudinal direction is longer than that of first cylindrical surface 20. In addition, first cylindrical surface 20 and second cylindrical surface 30 are arranged such that entire first cylindrical surface 20 is included between the upper end and the lower end of second cylindrical surface 30 as seen from the longitudinal direction. First cylindrical surface 20 and second cylindrical surface 30 are arranged such that central axis 25 of first cylindrical surface 20 is displaced from the center of second cylindrical surface 30 as seen from the horizontal direction (a direction along the upper surface or the lower surface of cylinders 20A and 30A) and is included in the cylinder of second cylindrical surface 30.

The three-dimensional mapping space is a virtual three-dimensional space which is constructed on a memory. The displacement direction and the amount of displacement of first cylindrical surface 20 and second cylindrical surface 30 are determined on the basis of data for the enlargement direction and the magnification supplied from zoom projection setting section 15.

When first cylindrical surface 20 and second cylindrical surface 30 are constructed as described above, zoom projection section 13 maps panoramic image 80 (see FIG. 16A) supplied from standard projection section 12 to first cylindrical surface 20. Panoramic image 80 is mapped such that all 360-degree images forming panoramic image 80 are connected to each other on first cylindrical surface 20.

Then, zoom projection section 13 performs a process of projecting and mapping each pixel on first cylindrical surface 20 to second cylindrical surface 30 using central point O (central point O of central axis 25 of cylinder 20A) of first cylindrical surface 20 as a projection point of view. For example, zoom projection section 13 enlarges a column of pixels 22 which overlaps straight line a in FIG. 14 to a row of pixels 32 which overlaps straight line b and projects the enlarged row of pixels. In addition, zoom projection section 13 reduces a row of pixels 21 which overlaps straight line d in FIG. 14 to a column of pixels 31 which overlaps straight line c and projects the reduced row of pixels. Zoom projection section 13 continuously projects pixels in the other range in the same manner as described above. Then, zoom projection section 13 enlarges or reduces the image projected onto second cylindrical surface 30 to obtain panoramic image 90 (see FIG. 16B).

As illustrated in FIG. 16B, panoramic image 90 in which all 360-degree images in all viewing directions are included, images in some directions are enlarged, images in directions opposite to the directions are reduced, and the magnification is not discontinuous in a continuous range is obtained by the zoom projection process. In FIG. 16B, the left and right ends of panoramic image 90 are cut. However, in the stage in which projection to second cylindrical surface 30 is performed, the left end and the right end of panoramic image 90 are connected to each other. Therefore, the magnifications at the two cut portions are equal to each other.

The magnification of each portion of panoramic image 90 is determined by the displacement direction and the amount of displacement of first cylindrical surface 20 and second cylindrical surface 30. For example, as illustrated in FIGS. 14 and 15, the magnification of the image of portions which overlap straight lines a and b is "distance Ob/distance Oa" and the magnification of the image of portions which overlap straight lines c and d is "distance Oc/distance Od". Zoom projection section 13 is configured so as to change the displacement direction and the amount of displacement of first cylindrical surface 20 and second cylindrical surface 30 depending on data for the enlargement direction and the magnification input from zoom projection setting section 15 and generate panoramic image 90 which is enlarged or reduced in the designated enlargement direction and at the designated magnification. Zoom projection section 13 displaces first cylindrical surface 20 and second cylindrical surface 30 in a direction in which the distance between a point indicating the designated enlargement direction and central point O is the largest. In addition, zoom projection section 13 determines the amount of displacement of first cylindrical surface 20 and second cylindrical surface 30 on the basis of the designated magnification.

The zoom projection method can be changed in various ways. For example, first cylindrical surface 20 and second cylindrical surface 30 may be constructed so as to have different radii, may be arranged such that the central axes thereof overlap each other, and may displace the projection point of view from the center. Then, the zoom projection process may be performed. This zoom projection process makes it possible to enlarge or reduce the panoramic image at the same magnification in each viewing direction in a turn of the panoramic image.

[Display Data Generation Process]

Figure 17A:
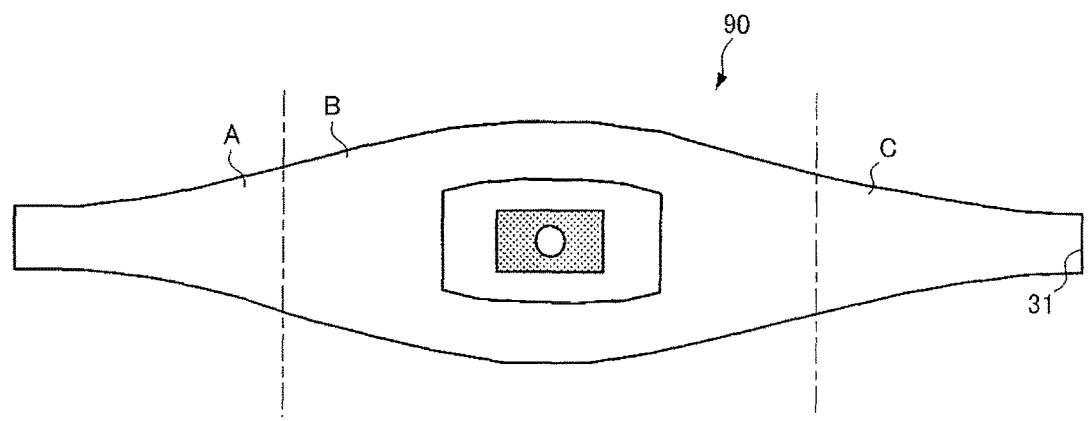
FIGS. 17A to 17C are diagrams illustrating first to third processing steps of generating display data from the panoramic image after the zoom projection process.
Figure 17B:
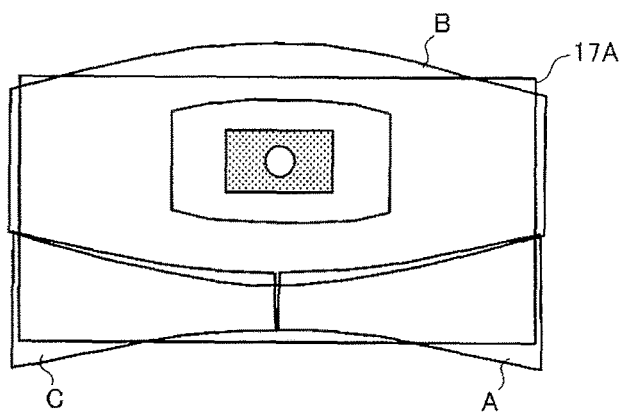
Figure 17C:
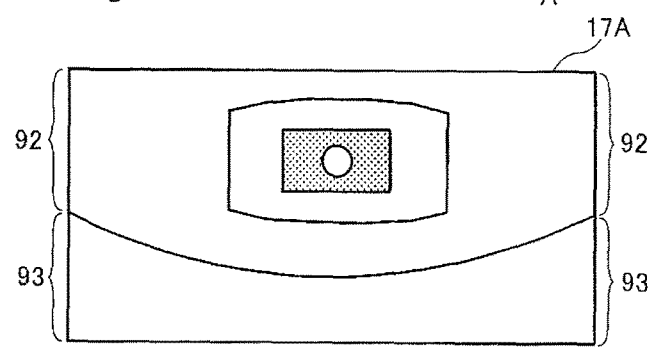

FIGS. 17A to 17C are diagrams illustrating first to third processing steps of generating display data from the panoramic image after the zoom projection process.

Image output section 16 performs the display data generation process using data for panoramic image 90 after the zoom projection process. In the display data generation process, first, as illustrated in FIG. 17A, image output section 16 performs a cutting process of dividing panoramic image 90 into a plurality of equal parts in the longitudinal direction. For example, image output section 16 cuts panoramic image 90 into image fragments A and C and fragment B at the positions represented by a one-dot chain line in FIG. 17A. As illustrated in FIG. 17B, image output section 16 performs a process of arranging fragments A to C in, for example, a plurality of stages (for example, two stages) so as to correspond to display frame 17A of display 17. Then, image output section 16 trims portions which are removed into the upper and lower ends of display frame 17A and an overlap portion between upper fragment B and lower fragments A and C such that panoramic image 90 has a two-stage configuration as illustrated in FIG. 17C and generates display data for an image in display frame 17A. Here, one end and the other end of cut portion 92 of panoramic image 90 have the same magnification and it is possible to continuously connect the images. The same applies to cut portion 93. In the trimming of the portions which are removed from display frame 17A, when a negligibly small portion of panoramic image 90 in the longitudinal direction is also trimmed, it is possible to maintain the operation of connecting the panoramic image in a cylindrical shape in one's head.

Figure 18A:
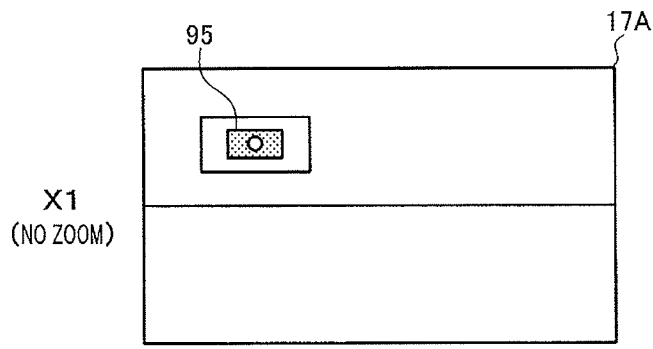
FIGS. 18A to 18C are diagrams illustrating first to third display examples of a panoramic image.
Figure 18B:
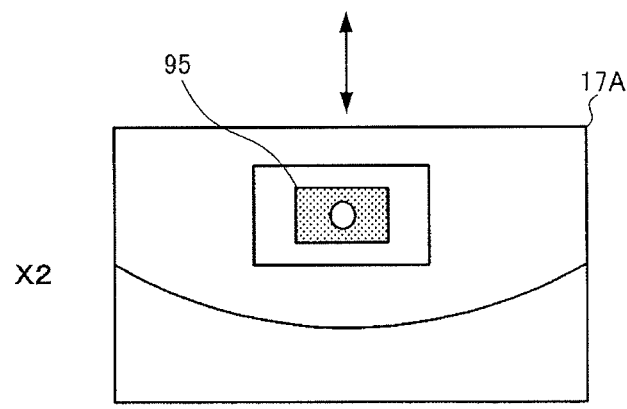
Figure 18C:
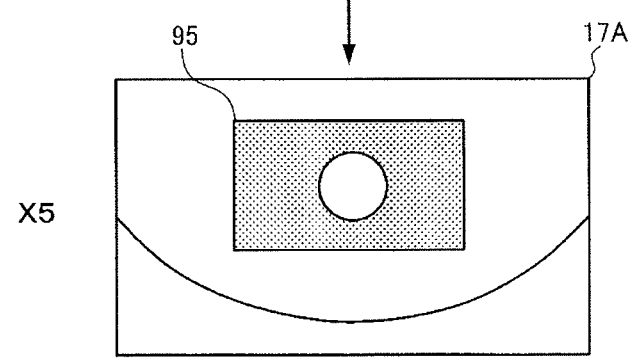

FIGS. 18A to 18C are diagrams respectively illustrating the first to third display examples of the panoramic image. When the display data generated by the image output section 16 is output to display 17 as described above, a display image illustrated in FIGS. 18A to 18C is output to the display 17. FIG. 18A illustrates an example of the display image when a zoom projection magnification is 1 (no zoom), FIG. 18B illustrates an example of the display image when the magnification is 2 in the direction of object 95, and FIG. 18C illustrates an example of the display image when the magnification is 5 in the direction of object 95. When the selection of the enlargement direction or the magnification is switched by input receiving section 14, the display images illustrated in FIGS. 18A to 18C are switched.

In the panoramic image illustrated in FIG. 17A, in practice, the ends of the data mapped onto the projection surface (second cylindrical surface 30) of zoom projection section 13 are connected to each other. When the data is cut out, 360-degree data is not necessarily used as panoramic image data, but a substantially 360-degree area may be used.

[Variation of Zoom Projection Process]

Figure 19:
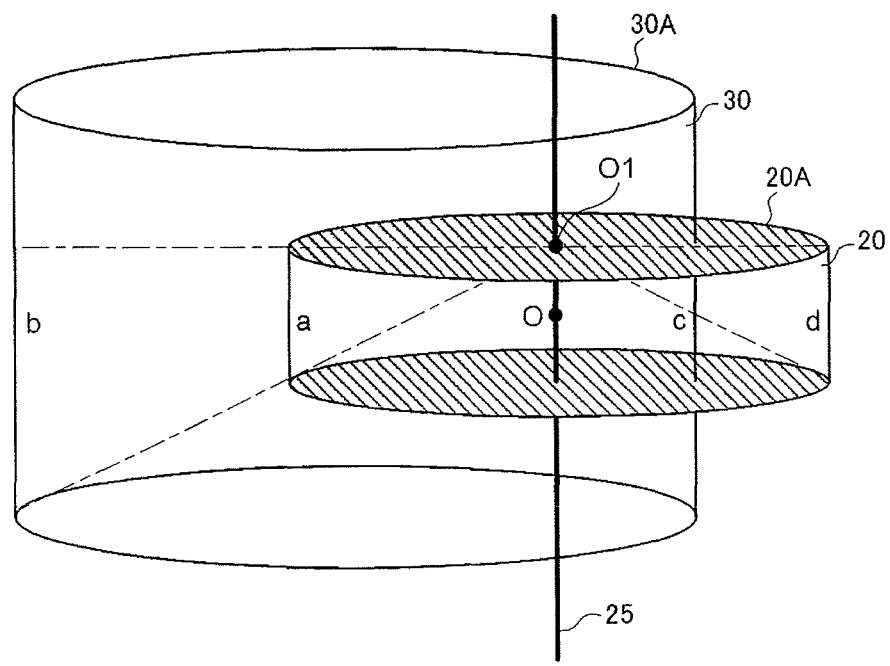
FIG. 19 is a diagram illustrating a three-dimensional mapping space for describing a first variation of the zoom projection process.
Figure 20:
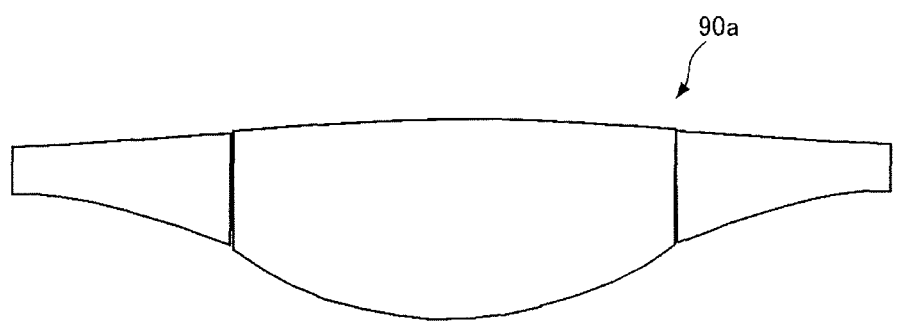
FIG. 20 is a diagram illustrating a panoramic image after the zoom projection process illustrated in FIG. 19.

FIG. 19 is a diagram illustrating a three-dimensional mapping space for describing a first variation of the zoom projection process and FIG. 20 is a diagram illustrating a panoramic image after the zoom projection process.

In the first variation of the zoom projection process, first cylindrical surface 20 to which a panoramic image before zoom projection is mapped and second cylindrical surface 30 to which the panoramic image is zoomed and projected are constructed by the same method as that in the above-mentioned zoom projection process (see FIG. 14). In the first variation, as illustrated in FIG. 19, projection point of view O1 is set to the height of the upper end of first cylindrical surface 20 and the projection process is performed.

According to the zoom projection process, as illustrated in FIG. 20, panoramic image 90a after the zoom projection process can have a shape in which the upper end is straight in all viewing directions (360°), an enlarged portion swells downward, and a reduced portion shrinks upward. In the zoom projection process, it is possible to obtain panoramic image 90a in which the magnification is not discontinuous in a continuous range.

Figure 21:
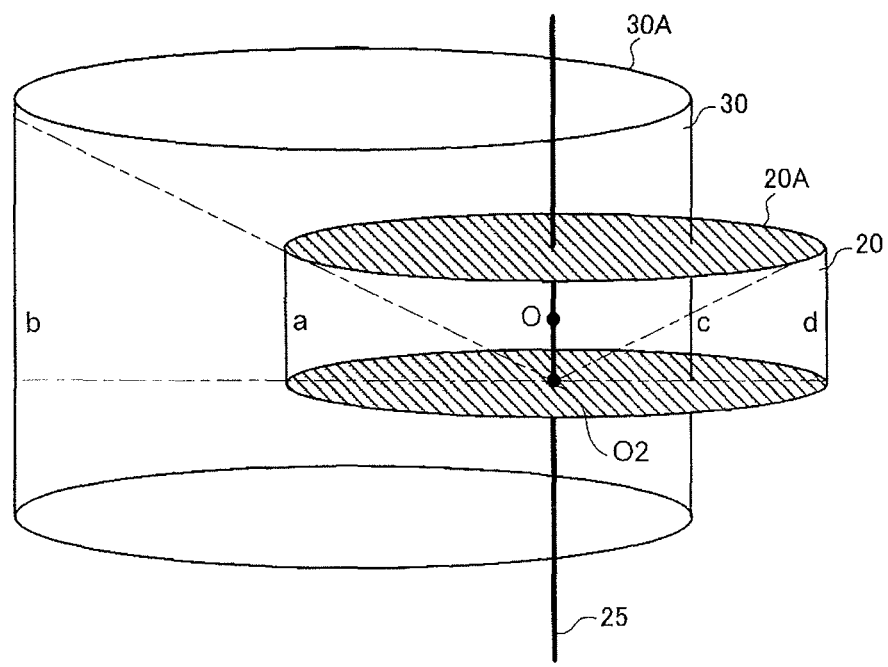
FIG. 21 is a diagram illustrating a three-dimensional mapping space for describing a second variation of the zoom projection process.
Figure 22:
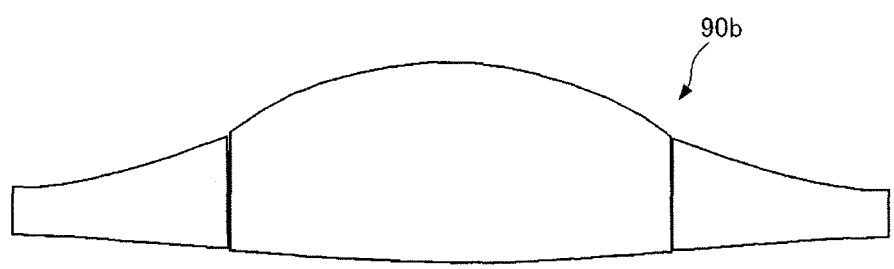
FIG. 22 is a diagram illustrating a panoramic image after the zoom projection process illustrated in FIG. 21.

FIG. 21 is a diagram illustrating a three-dimensional mapping space for describing a second variation of the zoom projection process and FIG. 22 is a diagram illustrating a panoramic image after the zoom projection process.

In the second variation of the zoom projection process, first cylindrical surface 20 to which a panoramic image before zoom projection is mapped and second cylindrical surface 30 to which the panoramic image is zoomed and projected are constructed by the same method as that in FIG. 14. In the second variation, as illustrated in FIG. 21, projection point of view O2 is set to the height of the lower end of first cylindrical surface 20 and a projection process is performed.

According to the zoom projection process, as illustrated in FIG. 22, panoramic image 90b after the zoom projection process can have a shape in which the lower end is straight in all viewing directions (360°), an enlarged portion swells upward, and a reduced portion shrinks downward. In the zoom projection process, it is possible to obtain panoramic image 90b in which the magnification is not discontinuous in a continuous range.

Figure 23:
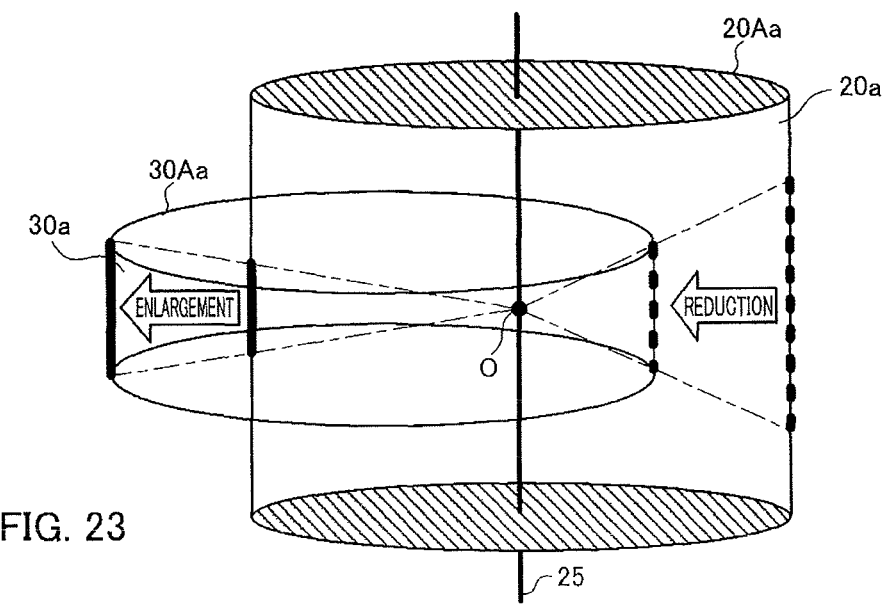
FIG. 23 is a diagram illustrating a three-dimensional mapping space for describing a third variation of the zoom projection process.
Figure 24A:
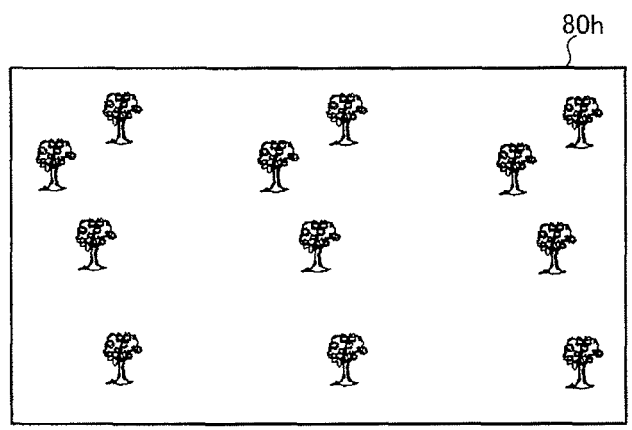
FIG. 24A is a diagram illustrating a panoramic image before the zoom projection process illustrated in FIG. 23.
Figure 24B:
FIG. 24B is a diagram illustrating a panoramic image after the zoom projection process illustrated in FIG. 23.
Figure 24B:
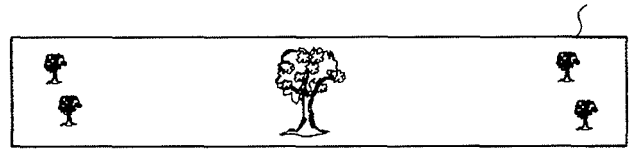

FIG. 23 is a diagram illustrating a three-dimensional mapping space for describing a third variation of the zoom projection process and FIGS. 24A and 24B are diagrams illustrating panoramic images before and after the zoom projection process, respectively.

In the third variation of the zoom projection process, zoom projection section 13 constructs first cylindrical surface 20a and second cylindrical surface 30a as follows. That is, zoom projection section 13 constructs first cylindrical surface 20a and second cylindrical surface 30a such that first cylindrical surface 20a to which the panoramic image before zoom projection is mapped is elongated in the longitudinal direction and second cylindrical surface 30a to which the panoramic image is zoomed and projected is shortened in the longitudinal direction. The construction method of zoom projection section 13 is not particularly limited, but zoom projection section 13 constructs first cylindrical surface 20a and second cylindrical surface 30a so as to have the same diameter (cylinders 20Aa and 30Aa have the same diameter). In addition, zoom projection section 13 arranges first cylindrical surface 20a and second cylindrical surface 30a such that second cylindrical surface 30a is disposed between the upper end and the lower end of first cylindrical surface 20a as viewed from the longitudinal direction and central axis 25 of first cylindrical surface 20a is disposed inside second cylindrical surface 30a as viewed from the horizontal direction.

After the cylindrical surfaces are constructed, zoom projection section 13 maps panoramic image 80h in which 360-degree images in all directions are connected so as to fill up the entire circumference of first cylindrical surface 20a. As illustrated in FIG. 24A, an image with a large width (a large number of pixels) in the longitudinal direction is applied as panoramic image 80h. Then, zoom projection section 13 projects panoramic image 80h of first cylindrical surface 20a onto second cylindrical surface 30a, using central point O of first cylindrical surface 20a as a projection point of view. Since panoramic image 80h before projection has a large width in the longitudinal direction, a portion of the upper side or the lower side of panoramic image 80h is cut and panoramic image 80h is projected onto entire first cylindrical surface 20a. Therefore, as illustrated in FIG. 24B, panoramic image 90h after projection has a constant width in the longitudinal direction. In panoramic image 90h, an enlarged portion has a narrow field of view as if it is zoomed in and a reduced portion has a wide field of view as if it is zoomed out. When the mapping is performed, panoramic image 90h after projection can have the same width (vertical direction), regardless of a zoom factor. Therefore, it is possible to change the impression of a displayed image.

Figure 25:
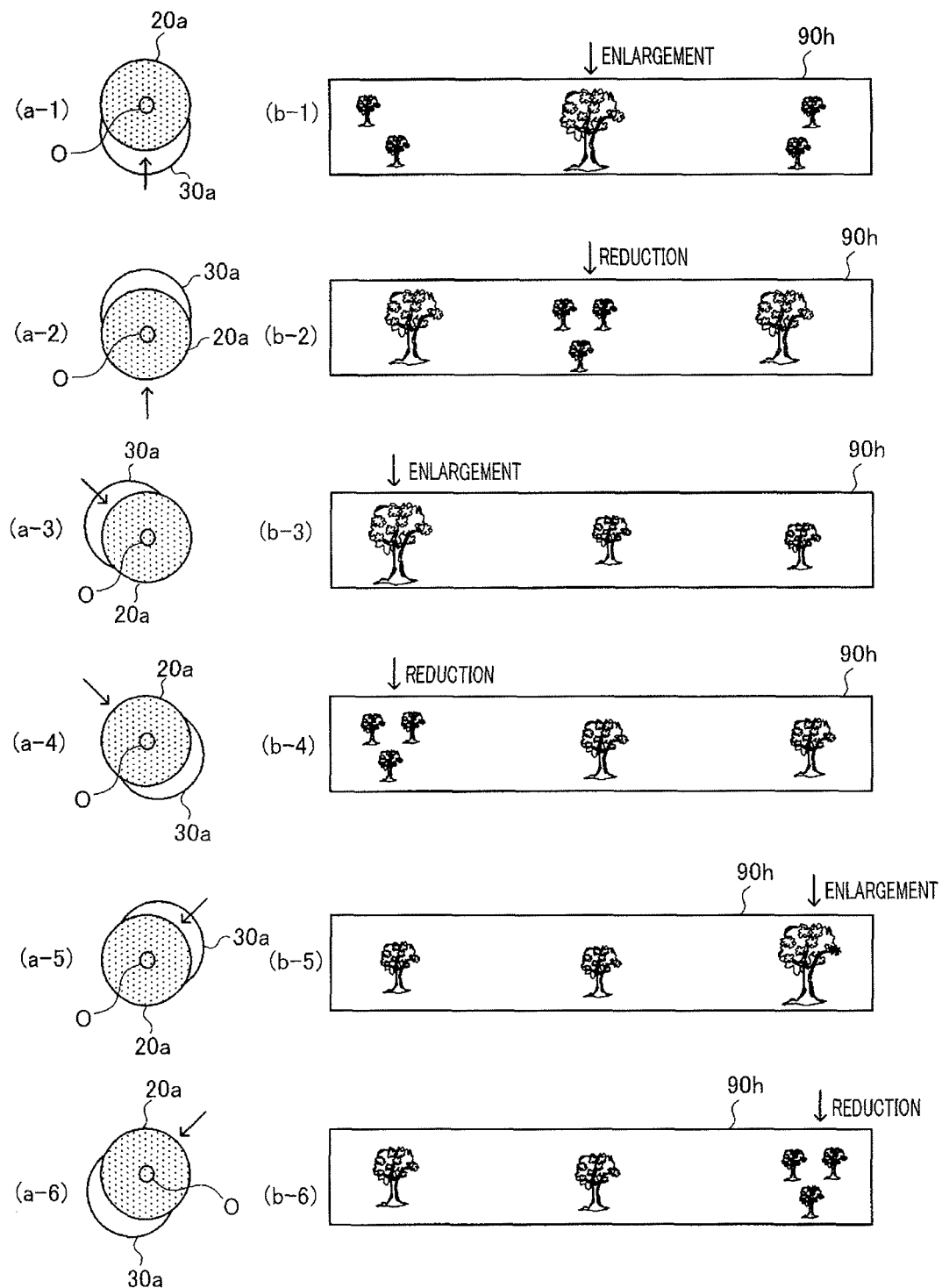
FIG. 25 is a diagram illustrating variations (a-1) to (a-6) of the relative arrangement between the first cylindrical surface and the second cylindrical surface for zoom projection and panoramic images (b-1) to (b-6) corresponding to relative arrangement after zoom projection.

FIG. 25 is a diagram illustrating the relationship between the relative arrangement between first cylindrical surface 20a and second cylindrical surface 30a and panoramic image 90h after zoom projection. In FIG. 25, plan views denoted by (a-1) to (a-6) illustrate the first to sixth examples of the relative arrangement, respectively, and in FIG. 25, diagrams dented by (b-1) to (b-6) are diagrams illustrating the panoramic images corresponding to the first to sixth examples of the relative arrangement, respectively.

In the third variation of the zoom projection process, as illustrated in (a-1) to (a-6) of FIG. 25, the direction in which the second cylindrical surface 30 is displaced from the center of first cylindrical surface 20a is changed in various ways to enlarge or reduce the panoramic image in various directions as illustrated in (b-1) to (b-6) of FIG. 25.

Figure 26A:
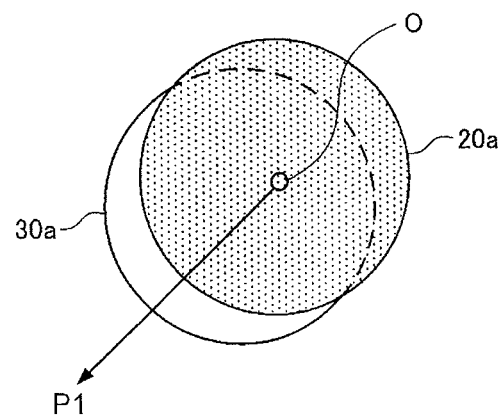
FIGS. 26A to 26C are diagrams respectively illustrating first to third examples of a method for designating an enlargement direction.
Figure 26B:
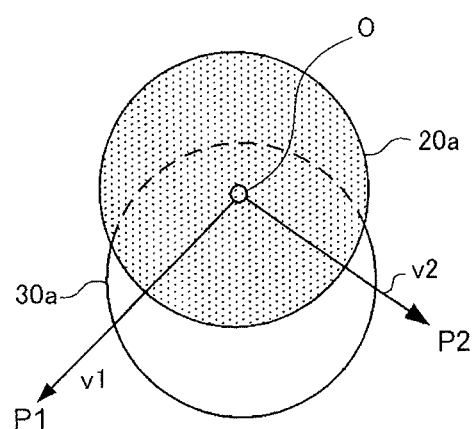
Figure 26C:
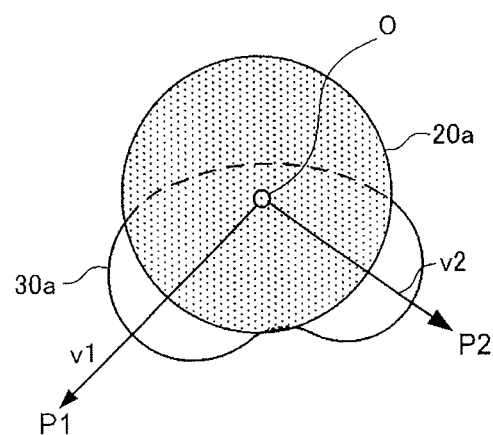

FIGS. 26A to 26C are plan views illustrating the first to third examples of a method for designating the enlargement direction. In the third variation of the zoom projection process, when the enlargement direction and the magnification are input through input receiving section 14, it is possible to perform the zoom projection process corresponding to the input enlargement direction and magnification. For example, in the example illustrated in FIG. 26A, arbitrary point P1 of panoramic image 80h mapped to first cylindrical surface 20a and a magnification (which is represented by the length of an arrow in FIG. 26) are input through input receiving section 14. In this case, as illustrated in FIGS. 26A to 26C, second cylindrical surface 30a is displaced by an amount corresponding to the magnification in the direction including designated point P1 and the zoom projection process is performed. Therefore, it is possible to obtain panoramic image 90h in which the direction of point P1 is enlarged.

In the example illustrated in FIG. 26B, two arbitrary points P1 and P2 of panoramic image 80h mapped to first cylindrical surface 20a and a magnification in each direction are input through input receiving section 14. In this case, as illustrated in FIG. 26B, second cylindrical surface 30a is displaced in the direction in which two vectors v1 and v2 based on the inputs in two directions are synthesized and with the length of the vectors and the zoom projection process is performed. Therefore, it is possible to obtain panoramic image 90*h* in which two designated directions are enlarged. Vectors v1 and v2 are defined so as to indicate the directions of designated points P1 and P2 and a length corresponding to each designated magnification.

In the example illustrated in FIG. 26C, two arbitrary points P1 and P2 of panoramic image 80*h* and a magnification in each direction are input through input receiving section 14, similarly to the example illustrated in FIG. 26B. In this example, the cross-sectional shape of second cylindrical surface 30*a* is not limited to a circular shape, but second cylindrical surface 30*a* swells so as to be away from central point O only in the designated enlargement direction. However, the length of the entire circumference of second cylindrical surface 30*a* is limited so as not to be changed. When second cylindrical surface 30*a* is configured in this way and the zoom projection process is performed, it is possible to obtain panoramic image 90*h* in which a plurality of designated enlargement directions are partially enlarged. In this example, the length of the entire circumference of second cylindrical surface 30*a* is limited so as not to be changed. However, when the length of the entire circumference is changed, a panoramic screen may be standardized such that the length thereof in the horizontal direction is n times (n=2, 3, 4, . . . ). During display, a panoramic image may be divided into images with a length of 1/n and the divided images may be output to the screen (see FIGS. 28A to 28C).

[Variation of Display of Panoramic Image]

Figure 27:
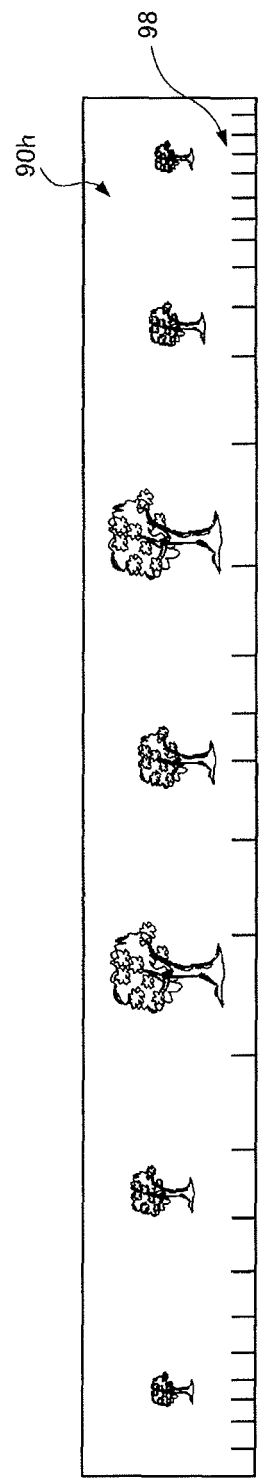
FIG. 27 is a diagram illustrating a display example of a panoramic image in which a scale display area indicating a magnification in each viewing direction is added to the panoramic image.

FIG. 27 illustrates a display example in which a scale indicating a magnification in each viewing direction is added to a panoramic image.

When a plurality of directions of panoramic image 90*h* are partially enlarged, as illustrated in FIG. 27, scale display (magnification display image) 98 indicating the magnification of panoramic image 90*h* in each viewing direction may be added and panoramic image 90*h* may be displayed. Scale display 98 enables the viewer to intuitively understand an enlarged portion and a reduced portion.

Scale display portion 98 indicates a magnification in each viewing direction using the display of scales and the scale interval is proportional to the magnification at a corresponding position. Scale display portion 98 is performed by adding scale images to the panoramic image before zoom projection at regular intervals and zooming and projecting the panoramic image for each scale image. In addition, the scale display may be configured such that the magnification is indicated by, for example, the gradation of a color (for example, a color closer to red indicates a higher magnification and a color closer to blue indicates a lower magnification) or color density.

Figure 28A:
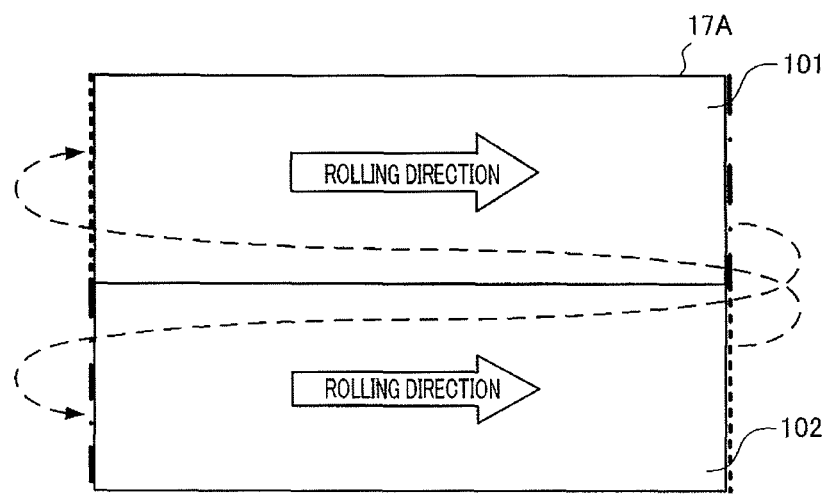
FIGS. 28A to 28C are conceptual diagrams respectively illustrating first to third display examples in which a panoramic image is divided into a plurality of stages.
Figure 28B:
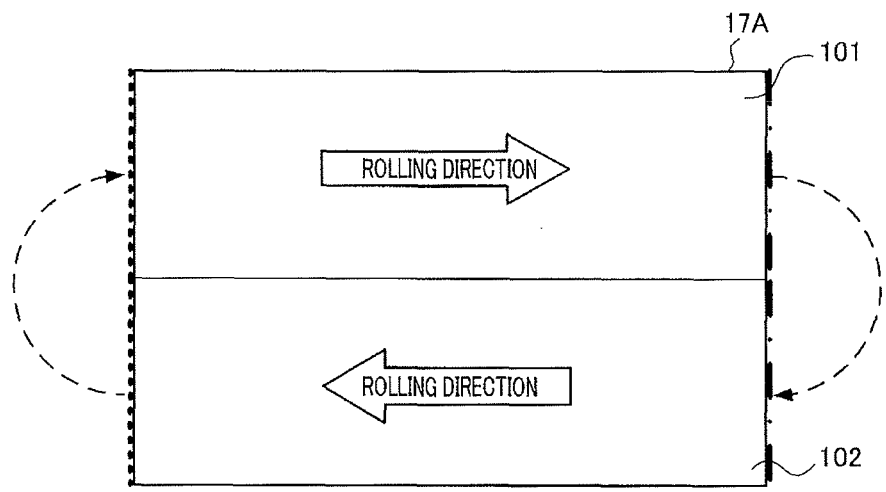
Figure 28C:
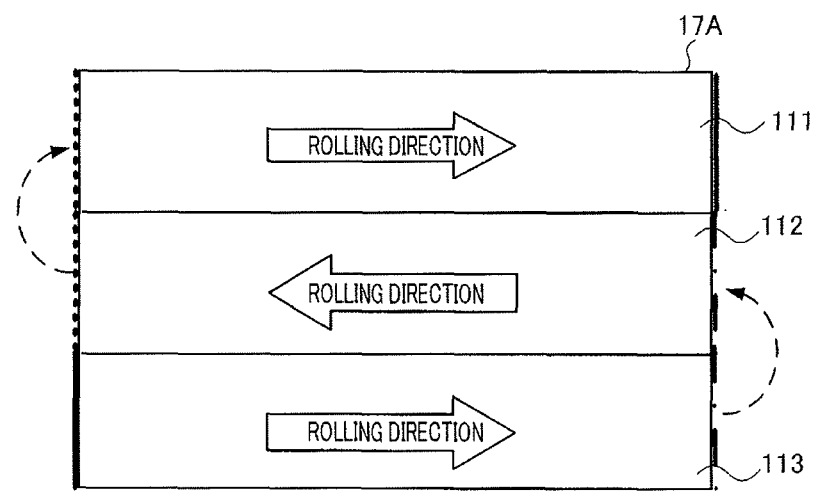

FIGS. 28A to 28C are conceptual diagrams respectively illustrating the first to third display examples of a panoramic image. First, as described with reference to FIG. 17, the panoramic image is a horizontally long image. Therefore, image output section 16 may cut the panoramic image into a plurality of parts with an equal length in the lateral direction along cutout lines which extend in the longitudinal direction and may display the cut parts in a plurality of stages. In FIGS. 28A to 28C, a panoramic image in which 360-degree images are connected to each other is divided into two image blocks 101 and 102 or three or more image blocks 111 to 113 and the divided image blocks are displayed in a plurality of stages. The left end and the right end of each of image blocks 101 and 102 or image blocks 111 to 113 are connected to the left end or the right end of the other corresponding image block 101 and 102 or the other image blocks 111 to 113 represented by dotted arrows in FIGS. 28A to 28C. The display in a plurality of stages makes it possible to effectively use display frame 17A of display 17.

Image output section 16 can slightly shift the cutting position of the panoramic image in the lateral direction to perform continuous display, thereby revolving (rolling) the display of the panoramic image in a plurality of stages in the lateral direction, as illustrated in FIGS. 28A to 28C. In the display example illustrated in FIG. 28A, two image blocks 101 and 102 are moved in the same rolling direction. In the display example illustrated in FIG. 28B, second image block 102 is reversed in the horizontal direction or in the vertical direction and the horizontal direction such that the first and the image blocks are moved in the opposite rolling direction. As such, since the panoramic image includes image block 102 which is reversed in the horizontal direction, continuous portions of the image are arranged close to each other at the left end and the right end of each of image blocks 101 and 102. Therefore, it is easy for the viewer to imagine how panoramic images are connected in a cylindrical shape. In the display example illustrated in FIG. 28C, second image block 112 is reversed in the horizontal direction or in the vertical direction and the horizontal direction, the rolling directions of the first and second image blocks and the rolling directions of the second and third image blocks are reversed, and the images are moved in the reversed rolling direction. Likewise, it is possible to roll the images in the three-stage display configuration.

In this variation, image output section 16 performs the process of cutting the image for the panoramic image supplied from zoom projection section 13, arranges cut image blocks 101 and 102 or image blocks 111 to 113 in a plurality of stages, and generates display data. Therefore, it is possible to display the panoramic image illustrated in FIGS. 28A to 28C.

[Example of Cooperation between Object Tracking Function and Panoramic Image Enlargement/Reduction Function]

FIGS. 29A and 29B, 31A and 31B, and 32A and 32B are diagrams illustrating an example of the cooperation between an object tracking function and a panoramic image enlargement/reduction function. FIGS. 29A and 29B are diagrams respectively illustrating a plurality of panoramic images 120*a* and 120*b* which are periodically acquired by the object tracking function (times t1 and t2). FIGS. 30A and 30B are diagrams respectively illustrating a plurality of panoramic images 121*a* and 121*b* after a zoom projection process used with the object tracking function. FIGS. 31A and 31B are diagrams respectively illustrating display examples 122*a* and 122*b* of a plurality of panoramic images when the object tracking function is used.

The object tracking function designates a specific object (for example, a person) in a captured image as a tracking object, searches for the designated tracking object from another captured image, and detects the position of the designated tracking object. In order to search for the tracking object, an arithmetic processing apparatus performs pattern recognition for the color or shape of the tracking object and compares each portion of a captured image, which is a search target, with the pattern of the tracking object. Then, the position of a portion of the image with the identical pattern is output as the position of the tracking object.

In this embodiment, the object tracking function is added to zoom projection section 13 and input receiving section 14 can be used to designate an arbitrary object in one captured image as the tracking object. The object tracking function is not necessarily provided in zoom projection section 13, and can be implemented by a method which receives the captured image output from imaging section 11 and inputs the position of the tracking object in the image to input receiving section 14.

Zoom projection section 13 receives a plurality of panoramic images 120a and 120b which are periodically obtained by imaging section 11, searches for the designated tracking object (in this embodiment, portrait G), and detects the position of the designated tracking object. When the position of the tracking object is detected, zoom projection section 13 rolls panoramic images 120a and 120b such that the position is substantially at the center. Then, zoom projection section 13 performs the zoom projection process such that the center is enlarged and generates panoramic images 121a and 121b illustrated in FIGS. 30A and 30B. Then, zoom projection section 13 outputs image data for the panoramic images to image output section 16.

Image output section 16 divides each of panoramic images 121a and 121b into two parts, generates display data for the divided parts, and outputs the display data to display 17. In this way, as illustrated in FIGS. 31A and 31B, display examples 122a and 122b of the two-stage panoramic image in which portrait which is a tracking target, is enlarged at the upper center are obtained.

Since the object tracking process and the panoramic image enlargement process are continuously performed for a plurality of panoramic images which are continuously captured, image display can be performed in which a moving tracking object is displayed substantially at a constant position and the background is moved with the movement of the tracking object.

[Variation of Panoramic Image Enlargement/Reduction Process]

In the above-described embodiment, the panoramic image is enlarged or reduced by the zoom projection process such that the magnification is continuous in all directions) (360°). However, the method for enlarging or reducing the panoramic image is not limited to the zoom projection process. For example, the enlargement/reduction method can be implemented by an image conversion process of the following arithmetic processing apparatus.

FIGS. 32A and 32B to 37 are diagrams illustrating variations of the panoramic image enlargement/reduction process. FIG. 32A is a diagram illustrating a panoramic image before the enlargement/reduction process. FIG. 32B is a graph illustrating a magnification in each viewing direction. FIG. 33 is a conceptual diagram illustrating an enlargement/reduction process in the longitudinal direction in this variation. FIG. 34 is a diagram illustrating a panoramic image after the enlargement/reduction process in the longitudinal direction.

In this variation, first, as illustrated in FIGS. 32A and 32B, the magnification of panoramic image 130 obtained by imaging section 11 in each viewing direction is designated. The magnification is set so as not to be discontinuous in the range in which the viewing direction is continuous. Since the left end and the right end of panoramic image 130 are aligned in the same viewing direction, the magnification is set such that the magnification of the left end is equal to that of the right end. Data for the magnification in each viewing direction is stored as function data or table data in, for example, zoom projection setting section 15 and zoom projection setting section 15 appropriately selects the data on the basis of the enlargement direction and magnification designated by the user.

When the magnification is designated, the arithmetic processing apparatus performs an image conversion process of extending or reducing each one of rows of pixels 131a to 131c of panoramic image 130 at the designated magnification in the longitudinal direction to obtain new pixels, as illustrated in FIG. 33. When the number of pixels in the longitudinal direction is greater than a predetermined value due to the extension or reduction process, the arithmetic processing apparatus trims an extra number of pixels. When the number of pixels in the longitudinal direction is less than the predetermined value, the arithmetic processing apparatus adds, for example, predetermined color pixels to make up a deficiency.

The enlargement/reduction process in the longitudinal direction is performed to enlarge or reduce original panoramic image 130 at the designated magnification in the longitudinal direction, thereby obtaining panoramic image 132, as illustrated in FIG. 34.

Figure 35A:
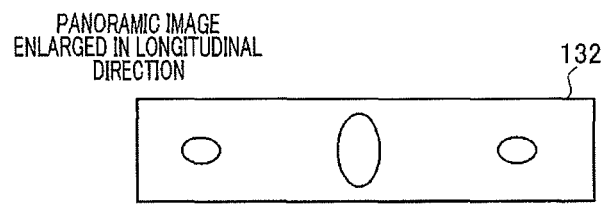
FIG. 35A is a diagram illustrating a panoramic image before an enlargement/reduction process in a lateral direction.
Figure 35B:
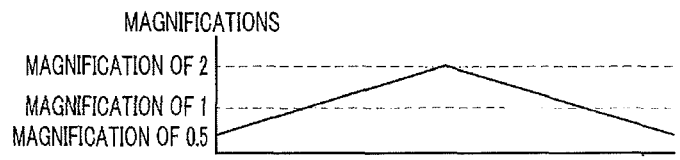
FIG. 35B is a graph illustrating the magnification in each viewing direction.
Figure 36:
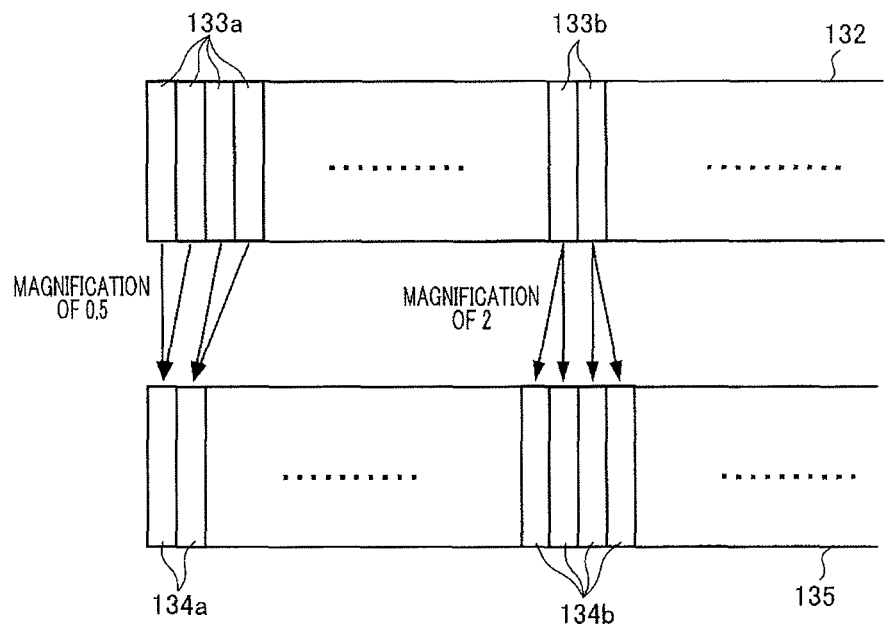
FIG. 36 is a conceptual diagram illustrating a process of enlarging or reducing a panoramic image in the lateral direction.
Figure 37:
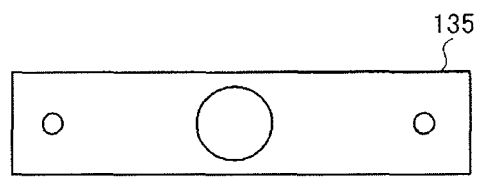
FIG. 37 is a diagram illustrating a panoramic image after the enlargement/reduction process in the longitudinal direction and the lateral direction.

FIG. 35A is a diagram illustrating a panoramic image before an enlargement/reduction process in a lateral direction and FIG. 35B is a graph illustrating a magnification in each viewing direction. FIG. 36 is a conceptual diagram illustrating the enlargement/reduction process in the lateral direction. FIG. 37 is a diagram illustrating a panoramic image after the enlargement/reduction process in the longitudinal and lateral directions.

When the enlargement/reduction process in the longitudinal direction is performed, the arithmetic processing apparatus performs an image conversion process of enlarging or reducing panoramic image 132 in the lateral direction. The magnification in each viewing direction which is used in the enlargement/reduction process in the longitudinal direction is also used in the enlargement/reduction process in the lateral direction, as illustrated in FIG. 35B.

In the enlargement/reduction process in the lateral direction, as illustrated in FIG. 36, for all rows of pixels 133a to 133a and 133b to 133b of panoramic image 132, the arithmetic processing apparatus performs an image conversion process of reducing rows of pixels 133a to 133a at the designated magnification in the lateral direction to obtain new rows of pixels 134a and 134a and an image conversion process of enlarging rows of pixels 133b to 133b at the designated magnification to obtain new rows of pixels 134b to 134b. Here, the enlargement and/or the reduction are performed in the order of the longitudinal direction and the lateral direction. However, the enlargement and the reduction may be performed in the longitudinal direction and the lateral direction at the same time.

The enlargement/reduction process in the lateral direction makes it possible to obtain panoramic image 135 which is enlarged or reduced at the designated magnification in the longitudinal direction and the lateral direction, on the basis of panoramic image 132 which is enlarged or reduced only in the longitudinal direction, as illustrated in FIG. 37. In the enlargement/reduction process, it is also possible to obtain panoramic image 135 which is enlarged or reduced in the longitudinal direction and the lateral direction in a continuous magnification in the range in which the viewing direction is continuous. In addition, the continuous magnifications of the left end and the right end where panoramic image 135 is cut are equal to each other.

As described above, according to the camera of the above-described embodiment and the image conversion apparatus thereof (zoom projection section 13, input receiving section 14, zoom projection setting section 15, and image output section 16), it is possible to continuously enlarge or reduce the entire panoramic image, which includes the images captured in each viewing direction in one turn, at different magnifications in each viewing direction. In addition, the magnification is continuous in the range in which the viewing direction is continuous. Therefore, it is possible to enlarge the point of interest in the panoramic image and display the panoramic image using the function of enlarging or reducing the panoramic image. In addition, the viewer can easily connect the enlarged or reduced panoramic images in a cylindrical shape in the head and imagine a perspective of the entire circumference.

According to the camera of the above-described embodiment and the image conversion configuration thereof, it is possible to easily generate a panoramic image which is naturally and smoothly enlarged or reduced, using the process of zoom projection section 13 that projects a panoramic image from a cylindrical surface to another cylindrical surface.

In the above-described embodiment, the camera includes imaging section 11 and display 17. However, an image conversion apparatus including zoom projection section 13, input receiving section 14, zoom projection setting section 15, and image output section 16 may be separately provided.

In the above-described embodiment, the standard projection section is used to position a desired area in the vicinity of the center of the screen and the zoom projection section is used to enlarge the desired area. However, the process of the standard projection section may not be performed and only the process of the zoom projection section may be performed to enlarge the desired area.

In the above-described embodiment, the standard projection section and the zoom projection section are used to perform projection in two stages. However, a projection surface capable of implementing the standard projection section and the zoom projection section at a time may be used. Specifically, for example, it is possible to perform both positioning and zooming at a time by moving up and down cylinder 20A illustrated in FIG. 14 depending on the height of the line of sight, and inclining cylinder 20A depending on the inclination of the horizontal direction.

In the above-described embodiment, an input image is a 360-degree panoramic image. However, the image which is input and then subjected to the zoom process is not limited to the 360-degree image. For example, the invention can be applied to a 270-degree wide-angle image, a 180-degree wide-angle image, a 120-degree wide-angle image, and wide-angle images captured at other angles.

An example in which the input image is a 270-degree wide-angle image will be described. In this example, the same process as that performed for the panoramic image is performed for the input 270-degree wide-angle image before processing except that the 270-degree wide-angle image replaces the panoramic image on first cylindrical surface 20 illustrated in FIG. 14. When the standard projection process is performed, a wide-angle image before processing may be mapped to cylindrical surface 40 illustrated in FIG. 2. As such, it is possible to zoom in a necessary portion while maintaining (displaying) the range of 270 degrees, which is the entire range of the input image in the horizontal direction.

However, since the range of the input image is 270 degrees, the image is continuous from 0 degree to 270 degrees, but a portion from 270 degrees to 0 degree is not continuous. This is the characteristics of the input image, and is not due to the characteristics of the process.

As such, according to the invention, it is possible to zoom in a necessary portion while maintaining (displaying) the entire range of an input wide-angle image in the horizontal direction, and it is possible to enlarge a portion and display the enlarged portion while understanding the entire image. Therefore, understanding of the entire image and recognition of a detailed portion are possible at the same time, which in turn results in significant convenience.

The components described in the above embodiment including standard projection section 12, zoom projection section 13, zoom projection setting section 15, and image output section 16 may be formed by hardware. In addition, these components may be formed by software which is implemented by the execution of a program by a computer. The program may be recorded on a computer-readable recording medium. The recording medium may be a non-transitory recording medium such as a flash memory.

The disclosure of Japanese Patent Application No. 2011-144116, filed on Jun. 29, 2011, including the specification, drawings and abstract, is incorporated herein by reference in its entirety.

INDUSTRIAL APPLICABILITY

The invention can be appropriately applied to image input apparatuses such as still cameras and video cameras, or image processing apparatuses.

REFERENCE SIGNS LIST

11 Imaging section
13 Zoom projection section
14 Input receiving section
15 Zoom projection setting section
16 Image output section
17 Display
20, 20a First cylindrical surface
30, 30a Second cylindrical surface
70, 80, 80h, 90, 90a, 90b, 90h, 130, 132, 135 Panoramic image
98 Scale display (magnification display image)

The invention claimed is:
1. An image conversion apparatus comprising:
an image zoom processor that receives a rectangular panoramic image captured in a single image capture operation, and generates a non-rectangular processed panoramic image by processing the rectangular panoramic image,
wherein the image zoom processor enlarges a first area of the rectangular panoramic image, of which a position is determined according to a user input, such that a magnification of the enlarged first area gradually varies, and reduces a second area of the rectangular panoramic image, of which a position is determined according to a user input, such that a magnification of the reduced second area gradually varies, to generate the non-rectangular processed panoramic image,
wherein a width of the non-rectangular processed panoramic image, which has been enlarged and reduced by the image zoom processor, corresponds to a width of the rectangular panoramic image, in a longitudinal direction, and
wherein the magnification of the enlarged first area decreases from a first position to a second position, and the magnification of the reduced second area decreases from the second position to a third position, the first position being a position having a maximum magnification in the enlarged first area, the second position being a position where the enlarged first area meets the reduced second area, and the third position being a position having a minimum magnification in the reduced second area.

2. The image conversion apparatus according to claim 1, wherein the image zoom processor varies the magnification of the rectangular panoramic image, such that a line segment which extends in a vertical direction perpendicular to the longitudinal direction of the rectangular panoramic image is not a curve.

3. The image conversion apparatus according to claim 1, wherein the image zoom processor maps the rectangular panoramic image to a first cylindrical surface in a three-dimensional mapping space and then projects the mapped panoramic image to a second cylindrical surface generate the enlarged first area and the reduced second area, the second cylindrical surface overlapping the first cylindrical surface, and a position of a first axis of a first cylinder including the first cylindrical surface is different from a position of a second axis of a second cylinder including the second cylindrical surface.

4. The image conversion apparatus according to claim 2, further comprising a display data processor that generates display data for displaying and outputting the non-rectangular processed panoramic image, which has been enlarged and reduced by the image zoom processor, wherein
the display data processor generates the display data of the non-rectangular processed panoramic image, including a magnification display image indicating a magnification in each viewing direction of the non-rectangular processed panoramic image.

5. The image conversion apparatus according to claim 3, further comprising:
an information receiver that receives information indicating a viewing direction in which the rectangular panoramic image is enlarged or reduced, wherein
the image zoom processor changes a shape of at least one of the first cylindrical surface and the second cylindrical surface, or a relative position of the first cylindrical surface and the second cylindrical surface, based on the information received by the information receiver.

6. A camera comprising:
an imager that includes a lens, which forms an optical image of an object, and an imaging element, which converts an optical image formed by the lens into an electric signal, and that obtains the rectangular panoramic image;
the image conversion apparatus according to claim 1 that receives the rectangular panoramic image from the imager, and enlarges and reduces the panoramic image; and
a display that receives display data of the non-rectangular processed panoramic image, which has been enlarged and reduced by the image conversion apparatus, and displays the non-rectangular processed panoramic image.

7. An image conversion method comprising:
receiving a rectangular panoramic image captured in a single image capture operation; and
enlarging a first area of the rectangular panoramic image, of which a position is determined according to a user input, such that a magnification of the enlarged first area gradually varies, and reducing a second area of the rectangular panoramic image, of which a position is determined according to a user input, such that a magnification of the reduced second area gradually varies, to generate a non-rectangular processed panoramic image,
wherein a width of the non-rectangular processed panoramic image, which has been enlarged and reduced, corresponds to a width of the rectangular panoramic image, in a longitudinal direction, and
wherein the magnification of the enlarged first area decreases from a first position to a second position, and the magnification of the reduced second area decreases from the second position to a third position, the first position being a position having a maximum magnification in the enlarged first area, the second position being a position where the enlarged first area meets the reduced second area, and the third position being a position having a minimum magnification in the reduced second area.

8. A non-transitory computer-readable recording medium that stores therein a program causing a computer to execute operations comprising:
receiving a rectangular panoramic image captured in a single image capture operation; and
enlarging a first area of the rectangular panoramic image, of which a position is determined according to a user input, such that a magnification of the enlarged first area gradually varies, and reducing a second area of the rectangular panoramic image, of which a position is determined according to a user input, such that a magnification of the reduced second area gradually varies, to generate a non-rectangular processed panoramic image,
wherein a width of the non-rectangular processed panoramic image which has been enlarged and reduced corresponds to a width of the rectangular panoramic image in a longitudinal direction, and
wherein the magnification of the enlarged first area decreases from a first position to a second position, and the magnification of the reduced second area decreases from the second position to a third position, the first position being a position having a maximum magnification in the enlarged first area, the second position being a position where the enlarged first area meets the reduced second area and the third position being a position having a minimum magnification in the reduced second area.

9. The image conversion apparatus according to claim 1, further comprising a tracking processor that tracks a target in the rectangular panoramic image, wherein
the image zoom processor enlarges and reduces the rectangular panoramic image, such that the magnification of a position of the target tracked by the tracking processor in the non-rectangular processed panoramic image is greater than one.

10. The image conversion apparatus according to claim 1, wherein then image zoom processor that enlarges the first area of the rectangular panoramic image such that the magnification of the enlarged first area continuously and gradually varies, and reduces the second area of the rectangular panoramic image such that a magnification of the reduced second area continuously and gradually varies, to generate the non-rectangular processed panoramic image.

11. The image conversion apparatus according to claim 1, wherein the image zoom processor gradually varies the magnification of the enlarged first area and the magnification of the reduced second area without changing an optical system of an imager that forms an optical image corresponding to the rectangular panoramic image.

12. The image conversion apparatus according to claim 1, wherein the non-rectangular processed panoramic image includes a position in the longitudinal direction between the enlarged first area and the reduced second area, at which the magnification of the non-rectangular processed panoramic image corresponds to the magnification of the rectangular panoramic image.

13. The image conversion apparatus according to claim 1, wherein the magnification of the first enlarged area in the non-rectangular panoramic image is greater than the magnification of the first area in the rectangular panoramic image, and the second reduced area in the non-rectangular panoramic image is smaller than the magnification of the second area in the rectangular panoramic image.

14. The image conversion apparatus according to claim 1, wherein the rectangular panoramic image has a substantially constant magnification.

* * * * *